United States Patent
Eom et al.

(10) Patent No.: US 11,816,137 B2
(45) Date of Patent: Nov. 14, 2023

(54) METHOD FOR PROVIDING SEARCH WORD AND ELECTRONIC DEVICE FOR SUPPORTING THE SAME

(71) Applicant: Samsung Electronics Co., Ltd., Gyeonggi-do (KR)

(72) Inventors: Yuyoul Eom, Gyeonggi-do (KR); Sunghak Lee, Gyeonggi-do (KR); Keunyong Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 5 days.

(21) Appl. No.: 17/574,258

(22) Filed: Jan. 12, 2022

(65) Prior Publication Data

US 2022/0222281 A1    Jul. 14, 2022

Related U.S. Application Data

(63) Continuation of application No. PCT/KR2022/000376, filed on Jan. 10, 2022.

(30) Foreign Application Priority Data

Jan. 12, 2021  (KR) .................. 10-2021-0004082
Jan. 27, 2021  (KR) .................. 10-2021-0011281

(51) Int. Cl.
  *G06F 16/00*    (2019.01)
  *G06F 16/33*    (2019.01)
  (Continued)

(52) U.S. Cl.
  CPC .......... *G06F 16/334* (2019.01); *G06F 16/338* (2019.01); *G06F 16/353* (2019.01); *G06F 16/9024* (2019.01)

(58) Field of Classification Search
  None
  See application file for complete search history.

(56) References Cited

U.S. PATENT DOCUMENTS 9,134,137 B2 *  9/2015  Brush ................ G01C 21/3673
10,678,402 B1  6/2020  Parande
(Continued)

FOREIGN PATENT DOCUMENTS

CN        111782965       10/2020
KR      1020020010151       2/2002
(Continued)

OTHER PUBLICATIONS

International Search Report dated Mar. 25, 2022 issued in counterpart application No. PCT/KR2022/000376, 11 pages.

*Primary Examiner* — Debbie M Le
(74) *Attorney, Agent, or Firm* — The Farrell Law Firm, P.C.

(57) ABSTRACT

An electronic device is provided and includes a display module, at least one processor operably connected to the display module, and a memory operably connected to the at least one processor. The processor is configured to store a hierarchical word graph including a plurality of groups classified by a plurality of levels. The memory stores instructions that cause, when executed, the at least one processor to obtain an event while an application is executed, determine an intent and a score of the intent on the basis of the event, identify a level corresponding to the score of the intent from among the plurality of levels based on the intent and the score of the intent, determine one or more words from among words included in at least one group corresponding to the identified level, among the plurality of groups, based on an input for a search being detected, and display the one or more determined words through the display module.

16 Claims, 22 Drawing Sheets

(51) Int. Cl.
*G06F 16/338* (2019.01)
*G06F 16/901* (2019.01)
*G06F 16/35* (2019.01)

(56) References Cited

U.S. PATENT DOCUMENTS

| | | | |
|---|---|---|---|
| 11,106,690 B1* | 8/2021 | Dhillon | G06N 5/01 |
| 11,120,027 B2* | 9/2021 | Gupta | G06F 16/24575 |
| 2014/0025371 A1 | 1/2014 | Min | |
| 2014/0052437 A1 | 2/2014 | Longe et al. | |
| 2017/0132019 A1 | 5/2017 | Karashchuk et al. | |
| 2017/0249017 A1 | 8/2017 | Ryu et al. | |
| 2018/0040020 A1 | 2/2018 | Kurian et al. | |
| 2018/0307746 A1 | 10/2018 | Du et al. | |
| 2018/0308473 A1 | 10/2018 | Scholar | |
| 2020/0183884 A1* | 6/2020 | Kohlmeier | G06F 16/148 |
| 2020/0210505 A1 | 7/2020 | Yang et al. | |
| 2021/0081454 A1* | 3/2021 | Sar Shalom | G06F 16/367 |
| 2021/0209109 A1 | 7/2021 | Zhang et al. | |
| 2021/0374342 A1 | 12/2021 | Kim | |

FOREIGN PATENT DOCUMENTS

| | | |
|---|---|---|
| KR | 10-2016-0119738 | 10/2016 |
| KR | 1020190122331 | 10/2019 |
| KR | 1020200084260 | 7/2020 |

* cited by examiner

| Application names | Category Level 1 | Level | Topic ID | Application ID | Tags |
|---|---|---|---|---|---|
| Application 1 | Travel/Region | 2 | #1 | ID1 | Travel |
| Application 2 | Travel/Region | 3 | #5 | ID2 | Accommodation |
| Application 3 | Travel/Region | 4 | #3 | ID3 | Reservation |
| ... | ... | ... | ... | ... | ... |

| | Previous intent | Previous intent score | Current intent | Current intent score | Current App | Search word | Representative keyword |
|---|---|---|---|---|---|---|---|
| User #N: 1440 | | | | | | | |
| ... | | | | | | | |
| User #3: 1430 | X | X | Travel | 60 | Application 1 | Guam | Travel, Hotel, Accommodation, Flight, Tour... |
| | Travel | 60 | Travel | 75 | Application 2 | Dujitani | Hotel, Accommodation, Reservation, Accommodation, Pool Villa... |
| User #2: 1420 | Travel | 55 | Travel | 65 | Application 1 | Guam Restaurants | Travel, Hotel, Accommodation, Flight, Tour... |
| | Travel | 65 | Travel | 77 | Application 2 | Guam PIC | Hotel, Accommodation, Reservation, Accommodation, Pool Villa... |
| User #1: 1410 | Travel | 65 | Travel | 67 | Application 2 | Hotel A Guam | Hotel, Accommodation, Reservation, Accommodation, Pool Villa... |
| | Travel | 67 | Travel | 81 | Application 3 | Hotel Tour, Yacht, Snorkeling | Activities, Reservation, Ticket, Admission Ticket... |

METHOD FOR PROVIDING SEARCH WORD AND ELECTRONIC DEVICE FOR SUPPORTING THE SAME

CROSS-REFERENCE TO RELATED APPLICATIONS

This application is a Bypass Continuation Application of International Application No. PCT/KR2022/000376, designating the United States, and filed in the Korean Intellectual Property Receiving Office on Jan. 10, 2022, which claims priority to Korean Patent Application No. 10-2021-0004082, filed on Jan. 12, 2021, and Korean Patent Application No. 10-2021-0011281, filed on Jan. 27, 2021, in the Korean Intellectual Property Office, each of the disclosures of which are incorporated by reference herein in their entireties.

BACKGROUND

1. Technical Field

Various embodiments of the disclosure relate generally to a method of providing a search word and an electronic device supporting the same.

2. Background Art

In accordance with the rapid proliferation of electronic devices such as smartphones or tablet personal computers (PCs), various services are provided through the electronic devices. For example, the electronic devices provide a variety of information to users by executing various functions using applications.

The electronic devices may provide information desired by the user through a search function. For example, if a search word is input by the user while an application is running, the electronic device may search for information related to the search word and provide searched information to the user.

If text (e.g., a word, a morpheme, or alphabetic characters) is input into a search window, the electronic device supports a function of analyzing the input text to automatically complete a search word (e.g., a keyword) and recommend the same. For example, if text is input into a search window, the electronic device may recommend a search word including the input text on the basis of a specified method.

While the electronic device displays information related to the input search word, the user of the electronic device may wish to receive additional information in addition to the displayed information. If text is input into the search window while the electronic device displays information related to the input search word, the electronic device, based on a specified method, may recommend a search word including the input text, regardless of search intent of the user who wishes to receive more detailed information.

The technical problems to be solved by the disclosure are not limited to the technical problems mentioned above, and other technical problems that may be solved will be clearly understood by those skilled in the art to which the disclosure pertains from the description below.

SUMMARY

The present disclosure has been made to address the above-mentioned problems and disadvantages, and to provide at least the advantages described below.

Various embodiments of the disclosure relate to a method for providing a search word and an electronic device supporting the same, in which an electronic device may analyze the level (e.g., an intensity or degree) of information that a user wishes to receive while providing information using an application, and, if the user tries searching (e.g., if a focus is placed on a search window) or if the user enters a search-related input, provide (e.g., recommend) a search word that reflects the user's search intent on the basis of the analyzed level of information.

According to an aspect of the disclosure, an electronic device includes a display module, at least one processor operably connected to the display module, and a memory operably connected to the at least one processor and configured to store a hierarchical word graph including a plurality of groups classified by a plurality of levels, wherein the memory stores instructions that cause, when executed, the at least one processor to obtain an event while an application is executed, determine an intent and a score of the intent on the basis of the event, identify a level corresponding to the score of the intent from among the plurality of levels based on the intent and the score of the intent, determine one or more words from among words included in at least one group corresponding to the identified level, among the plurality of groups, based on an input for a search being detected, and display the one or more determined words through the display module.

According to another aspect of the disclosure, a method of providing a search word in an electronic device includes obtaining an event while an application is executed, determining an intent and a score of the intent on the basis of the event, identifying a level corresponding to the score of the intent from among a plurality of levels of a hierarchical word graph including a plurality of groups classified by a plurality of levels stored in a memory of the electronic device based on the intent and the score of the intent, determining one or more words from among words included in at least one group corresponding to the identified level, among the plurality of groups, based on an input for a search being detected, and displaying the one or more determined words through a display module of the electronic device.

A method for providing a search word and an electronic device for supporting the same according to various embodiments of the disclosure can analyze the level of information that a user wishes to receive while providing information using an application, and, if a search-related input is input by the user, provide a search word reflecting the user's search intent on the basis of the analyzed level of the information.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A and 4B are diagrams illustrating a hierarchical application category, according to various embodiments;

FIGS. 14, 15A, and 15B are diagrams illustrating methods in which a server updates a hierarchical application category, according to various embodiments:

DETAILED DESCRIPTION

Figure 1:
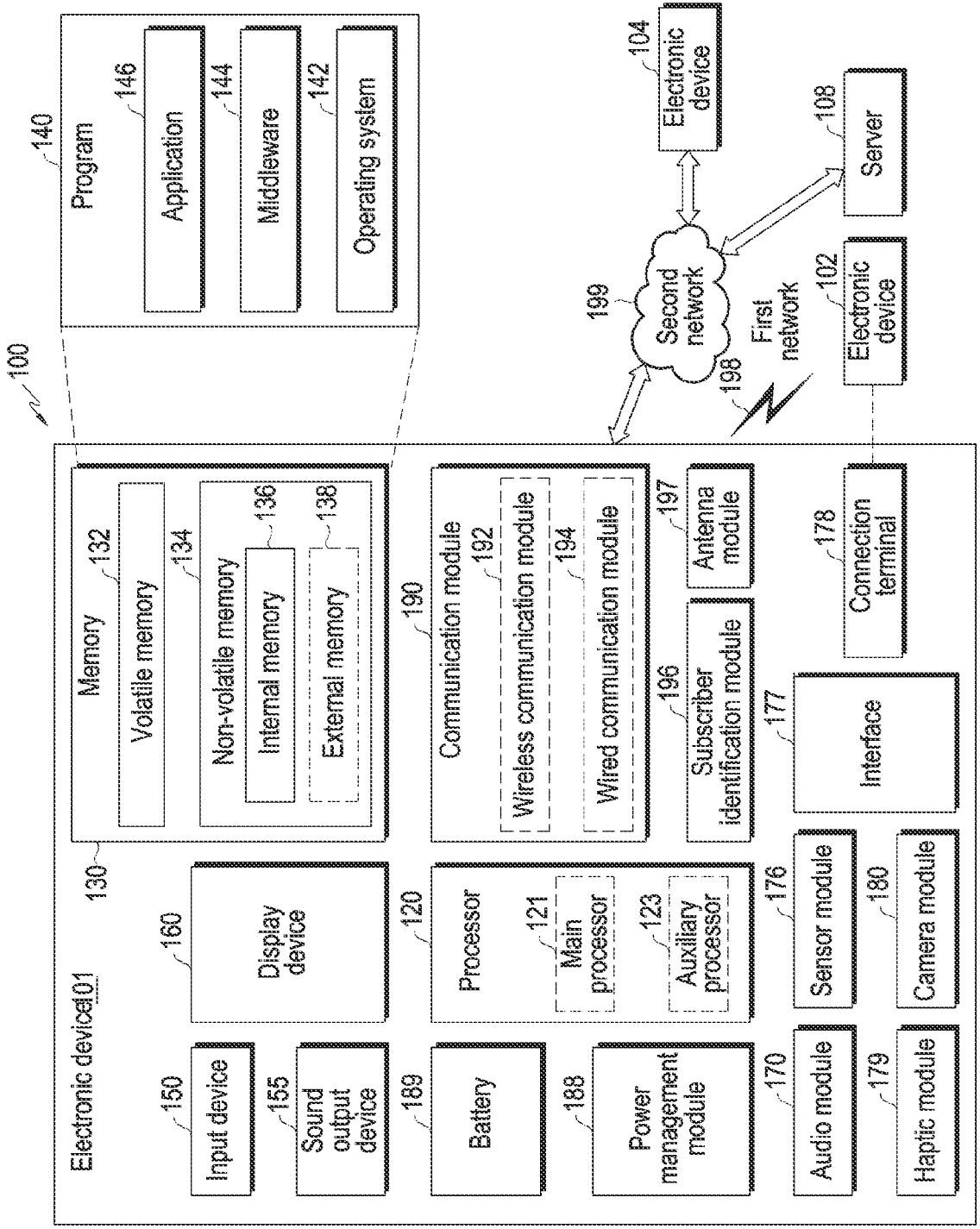
FIG. 1 is a block diagram of an electronic device in a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1 st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturers server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
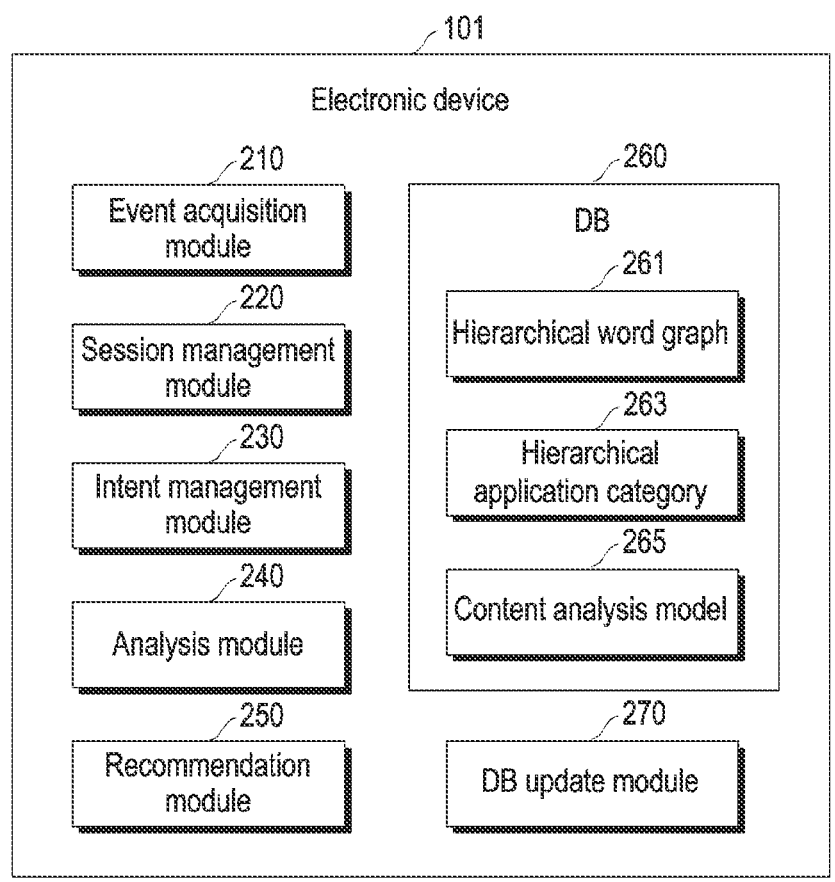
FIG. 2 is a block diagram illustrating an electronic device, according to an embodiment.

FIG. 2 is a block diagram illustrating an electronic device 101, according to an embodiment.

Referring to FIG. 2, the electronic device 101 includes an event acquisition module 210, a session management module 220, an intent management module 230, an analysis module 240, a recommendation module 250, a database (DB) 260, and/or a DB update module 270.

At least one or more of the event acquisition module 210, the session management module 220, the intent management module 230, the analysis module 240, the recommendation module 250, and/or the DB update module 270 may be stored in the memory 130 as software modules, and may be loaded to be executed by the processor 120. The DB 260 may be stored in the memory 130.

The event acquisition module 210 may obtain various events occurring in the electronic device 101.

The event acquisition module 210 may obtain an application switch event. For example, while a first application is running, the event acquisition module 210 may obtain (or receive) an event for executing a second application different from the first application (or an event indicating that the second application is running). In addition, while the first application is running, on the basis of a user input for executing the second application, the event acquisition module 210 may obtain an event for executing the first application in the background and executing the second application in the foreground. The event acquisition module 210 may obtain, as information related to an application switch event, information about an application before an application switch (e.g., the name and category of an application before an application switch) and information about an application after the application switch (e.g., the name and category of an application after an application switch).

The application switch event may include an event for switching a webpage (e.g., a website, a domain, or a blog) by a web application (or a web browser application), as well as an event indicating that the application is to be switched. For example, the application switch event may include an event for displaying, from a first webpage (e.g., a first main domain or a first high-level domain), a second webpage (e.g., a second main domain or a second high-level domain) that is different from the first webpage. The event acquisition module 210 may obtain, as information related to the event for switching a webpage, information about a webpage before a webpage switch (e.g., the address and/or category of the webpage before a webpage switch) and/or information about a webpage after a webpage switch (e.g., the address and/or category of a webpage after a webpage switch).

The event acquisition module 210 may obtain a screen switch event. For example, the event acquisition module 210 may obtain an event for displaying a screen, which is different from the screen displayed through the display module 160, on the basis of a user input to an object (e.g., an icon or a button) included in the screen displayed while the application is running.

The screen switch event may include an event for switching a webpage screen. For example, the event for switching a webpage screen may include an event for displaying, from a first webpage (e.g., a first subdomain or a first low-level domain), a second webpage (e.g., a second subdomain or a second low-level domain) that is different from the first webpage and has the same main domain (or high-level domain) as the first webpage.

The event acquisition module 210 may obtain a search word input event. For example, the event acquisition module 210 may obtain an event for inputting a search word (or an event indicating that a search word is input) on the basis of a user input for a voice input using a keyboard (e.g., a soft keyboard or a visual keyboard) or a microphone. The event acquisition module 210 may obtain, as information related to a search word input event, a search word input through an input means.

The event acquisition module 210 may include various events input while an application is running. For example, the event acquisition module 210 may obtain an event related to an input to a screen (e.g., a touch input to a screen or a click input to a screen) or while an application is running. In addition, the event acquisition module 210 may obtain an event related to scrolling on a screen (e.g., information on the number of scrolls on a screen and/or a speed of scrolling on a screen) while an application is running. Additionally, the event acquisition module 210 may obtain an event related to a time during which an application is running (e.g., information on the dwell time or elapsed time on a screen after an application is executed or after displaying the screen of an application).

The event acquisition module 210 may obtain information related to context. The event acquisition module 210 may obtain, as the information related to context, information about at least one of a current time, a place where the electronic device 101 is located, or an occasion. For example, the event acquisition module 210 may obtain information indicating that the user of the electronic device 101 is moving by bus in the evening on the basis of the current time, the place where the electronic device 101 is located, and the user's history of using the electronic device 101. However, the information related to context is not limited to the above-described example.

The event acquisition module 210 may obtain an event related to an input for a search. For example, the event acquisition module 210 may detect a user input to an input portion (e.g., a search window) for a search (e.g., a touch input to a search window or an input through an electronic pen). In addition, the event acquisition module 210 may detect that text for a search is input using a keyboard (or an electronic pen). Additionally, the event acquisition module 210 may obtain an event related to an input for a search on the basis of a voice input through a microphone. However, the method in which the event acquisition module 210 obtains an event related to an input for a search is not limited to the example described above.

The session management module 220 may produce, maintain, and/or release a session. The session may indicate a time period in which the electronic device 101 performs an operation of providing a search word on the basis of intent. For example, the electronic device 101 may perform an operation of recommending a search word on the basis of first intent until a session for the first intent is released after the session for the first intent is produced. In addition, if an event related to first intent (e.g., an intent switch event to the first intent) does not occur for a specified time after a session for the first intent is produced, the electronic device 101 may release a first session for the first intent. If the first session for the first intent is released, the electronic device 101 may not perform the operation of recommending a search word on the basis of the first intent. If an event related to the first intent occurs within the specified time after a session for the first intent is produced, the electronic device 101 may maintain a first session for the first intent. If an event related to the first intent occurs within the specified time after a session for the first intent is produced, the electronic device 101 may update (or initialize) the specified time such that the specified time restarts from the point in time at which the event related to the first intent occurs.

If intent is determined, the session management module 220 may produce a session for the intent (e.g., if a plurality of pieces of intent are determined, sessions for the respective pieces of intent may be produced).

The intent management module 230 may detect (or recognize) intent and determine the intent.

The intent may indicate a category (or also referred to as a "highest category") corresponding to the highest level (or also referred to as "level 1") of a hierarchical word graph and a hierarchical application category, which will be described below. For example, a plurality of applications and a plurality of webpages (e.g., the domains of webpages) may be (hierarchically) classified by levels on the hierarchical application category on the basis of the category. The intent may indicate the highest category of the category to which a currently running application belongs.

The intent management module 230 may detect intent by identifying the highest category of a currently running application. For example, the intent management module 230 may identify information on a currently running application (e.g., the name of an application and/or the identity (ID) of an application) and detect, as intent, the highest category of the category to which the currently running application belongs on a hierarchical category tree.

The intent management module 230 may detect intent on the basis of information obtained from the screen of an application. For example, the analysis module 240 may obtain a keyword from the content included in a screen displayed through the display module 160. The intent management module 230 may obtain a keyword from the analysis module 240 and detect, as intent, the highest category (e.g., a category corresponding to the highest level of the level corresponding to a group including the obtained keyword) of a group (or topic ID) including the obtained keyword (e.g., including words similar to the obtained keyword) in the hierarchical word graph. The topic ID may be an identifier for identifying a group including a keyword in the hierarchical word graph.

The intent management module 230 may detect intent on the basis of a search word input by the user. For example, the intent management module 230 may obtain a search word input through an input means (e.g., a keyboard) from the event acquisition module 210. The intent management module 230 may detect, as intent, the highest category of a group including the obtained search word in the hierarchical word graph.

Hereinafter, for the convenience of explanation, the detected (or recognized) intent will be referred to as a "candidate intent".

The intent management module 230 may perform scoring on the candidate intent, thereby determining (or confirming) the intent. Scoring may indicate an operation of increasing or reducing a score for the candidate intent or determined intent. The score may be a value indicating (or reflecting) the user's search intent, a search range, or a search depth for the intent. For example, the score may indicate the category of an application (or a range of the category of an application) that the user wishes to search for, among the highest category of an application (e.g., a currently running application) to the subcategories of the highest category of the application. Additionally, the score may indicate a range of words (or search words) that the user wishes to search for, among the words belonging to the highest category of an application.

The score for intent (e.g., a range of the score) may correspond to the level configured in the hierarchical word graph and the level configured in the hierarchical application category.

A plurality of groups classified by a plurality of levels may be configured for each highest category in the hierarchical word graph. Each of the plurality of groups may be a group including similar words. The plurality of levels may be configured when producing the hierarchical word graph using a technique of topic modelling (e.g., a latent dirichlet allocation (LDA) technique or a hierarchical dirichlet process (HDP) technique). The lower the level that the group belongs to, the hierarchical word graph may include words of a higher concept, and the higher the level that the group belongs to, the hierarchical word graph may include words of a lower concept relative to the words of a higher concept. Additionally or alternatively, the group belonging to a lower level (e.g., a group belonging to level 3) in the hierarchical word graph may include frequently searched words, compared to the group belonging to a higher level (e.g., a group belonging to level 4). At least some of the words included in the hierarchical word graph may be commonly included in groups belonging to different levels. The lowest level (e.g., level 1) may be configured for the highest category in the hierarchical word graph.

A plurality of application categories classified by a plurality of levels may be configured for each highest category in the hierarchical application category. The plurality of application categories, for example, may include applications belonging to the same (or similar) category. In the hierarchical application category, an application category belonging to the lower level may include applications of a higher category, and an application category belonging to the higher level may include applications of a lower category. The lowest level (e.g., level 1) may be configured for the highest category in the hierarchical application category.

The intent management module 230 may perform scoring on candidate intent on the basis of an event (and information related to the event) obtained from the event acquisition module 210.

The intent management module 230 may perform scoring on the candidate intent on the basis of an application switch event. If a second application (e.g., a currently running application) is executed after a first application is executed, the intent management module 230 may detect candidate intent on the basis of the second application or a screen displayed by the execution of the second application. If the highest category of the first application is the same as the highest category of the second application, the intent management module 230 may identify a level of the first application (e.g., a level corresponding to the category of the first application in the hierarchical application category) and a level of the second application (e.g., a level corresponding to the category of the second application in the hierarchical application category). If the level of the second application is greater than or equal to the level of the first application, the intent management module 230 may increase a score of the candidate intent. If the level of the second application is less than the level of the first application, the intent management module 230 may reduce a score of the candidate intent.

In addition, the intent management module 230 may perform scoring on the candidate intent on the basis of a screen switch event. The intent management module 230 may obtain a first keyword by analyzing the content included in a first screen before switching the screen through the analysis module 240. The intent management module 230 may obtain a second keyword by analyzing the content included in a second screen after switching the screen through the analysis module 240. If the level corresponding to a group (e.g., the topic ID) including the second keyword (or including words similar to the obtained keyword) is higher than or equal to the level corresponding to a group including the first keyword in the hierarchical word graph, the intent management module 230 may increase the score of the detected candidate intent. If the level corresponding to the group including the second keyword is less than the level corresponding to the group including the first keyword in the hierarchical word graph, the intent management module 230 may reduce the score of the detected candidate intent.

Additionally, the intent management module 230 may perform scoring on the candidate intent on the basis of a search word obtained from the event acquisition module 210. The intent management module 230 may increase the score for candidate intent related to a search word as the number of times the search word is input increases.

In addition, the intent management module 230 may perform scoring on the candidate intent on the basis of an event input while an application is running. The intent management module 230 may increase the score for candidate intent as touch inputs to the screen (or click inputs to the screen), the dwell time on the screen (e.g., an elapsed time after an application is executed), and/or the number of scroll inputs to the screen increase. The intent management module 230 may increase the score for candidate intent as the time during which the application is running increases.

The intent management module 230 may differently configure (or assign) the degree (e.g., speed or weight) of increasing (or reducing) the score when scoring the candidate intent.

When switching applications, the intent management module 230 may differently configure the degree of increasing the score for candidate intent on the basis of the difference between the level corresponding to an application before the application switch and the level corresponding to an application after the application switch. For example, assuming that the level of a first application before an application switch is level 2, the intent management module 230 may configure the degree of increasing the score for candidate intent to be greater in the case where the level of the second application after the application switch is level 4 than in the case where the level of the second application after the application switch is level 3.

The intent management module 230 may differently configure the degree of increasing the score for candidate intent, when switching a screen, on the basis of the difference between the level obtained on the basis of the content included in the screen before the screen switch (e.g., the level corresponding to a group including a keyword obtained from the content included in the screen in the hierarchical word graph) and the level obtained on the basis of the content included in the screen after the screen switch.

In connection with an input to the screen displayed after a search word is input (e.g., in the case where one piece of content is selected by the user from among multiple pieces of content (e.g., links to content) searched for through the search word input, the execution screen for the one piece of selected content), the intent management module 230 may configure the degree of increasing the score for candidate intent to be greater for an input to the screen displayed after the search word input than for an input to the screen displayed before the search word input.

The intent management module 230 may increase the degree of increasing the score for candidate intent as the speed of scrolling on the screen is reduced. The intent management module 230 may reduce the degree of increasing the score for candidate intent as the speed of scrolling on the screen increases. The intent management module 230 may configure the degree of increasing the score for candidate intent to be greater as the dwell time on the screen (e.g., the execution screen of an application) increases. The intent management module 230 may configure the degree of increasing the score for candidate intent to be smaller as the dwell time on the screen (e.g., the execution screen of an application) is reduced.

If the score for the candidate intent is greater than or equal to a threshold score, the intent management module 230 may determine (or confirm) the candidate intent as intent.

The intent management module 230 may continue to perform scoring on the determined intent after the intent is determined. For example, after the intent is determined, the intent management module 230 may perform the scoring operation for the determined intent, at least in part, in the same or similar manner as the above-described scoring operation for the candidate intent.

The intent management module 230 may determine the state of the intent. For example, the intent management module 230 may determine the state of the intent to be new entry, retention, switching, re-entry, or discarding on the basis of information on a session (e.g., the state of a session) and an event (and information related to the event) obtained through the event acquisition module 210. A method of determining the state of the intent will be described below.

The intent management module 230 may transmit information including the determined intent and the score of the intent to the recommendation module 250 (and/or the analysis module 240). For example, if an input for a search is detected, the intent management module 230 may transmit, to the recommendation module 250 (and/or the analysis module 240), at least one of the intent, the score of the intent, information about an application (e.g., the level corresponding to the category of an application), a search word input through a keyboard, or a keyword obtained from the content.

The analysis module 240 may determine the level corresponding to the intent score (e.g., the level on the hierarchical word graph) using the hierarchical word graph 261 included in the DB 260. Hereinafter, a method in which the analysis module 240 determines the level corresponding to the intent score using the hierarchical word graph 261 will be described with reference to FIG. 3.

Figure 3:
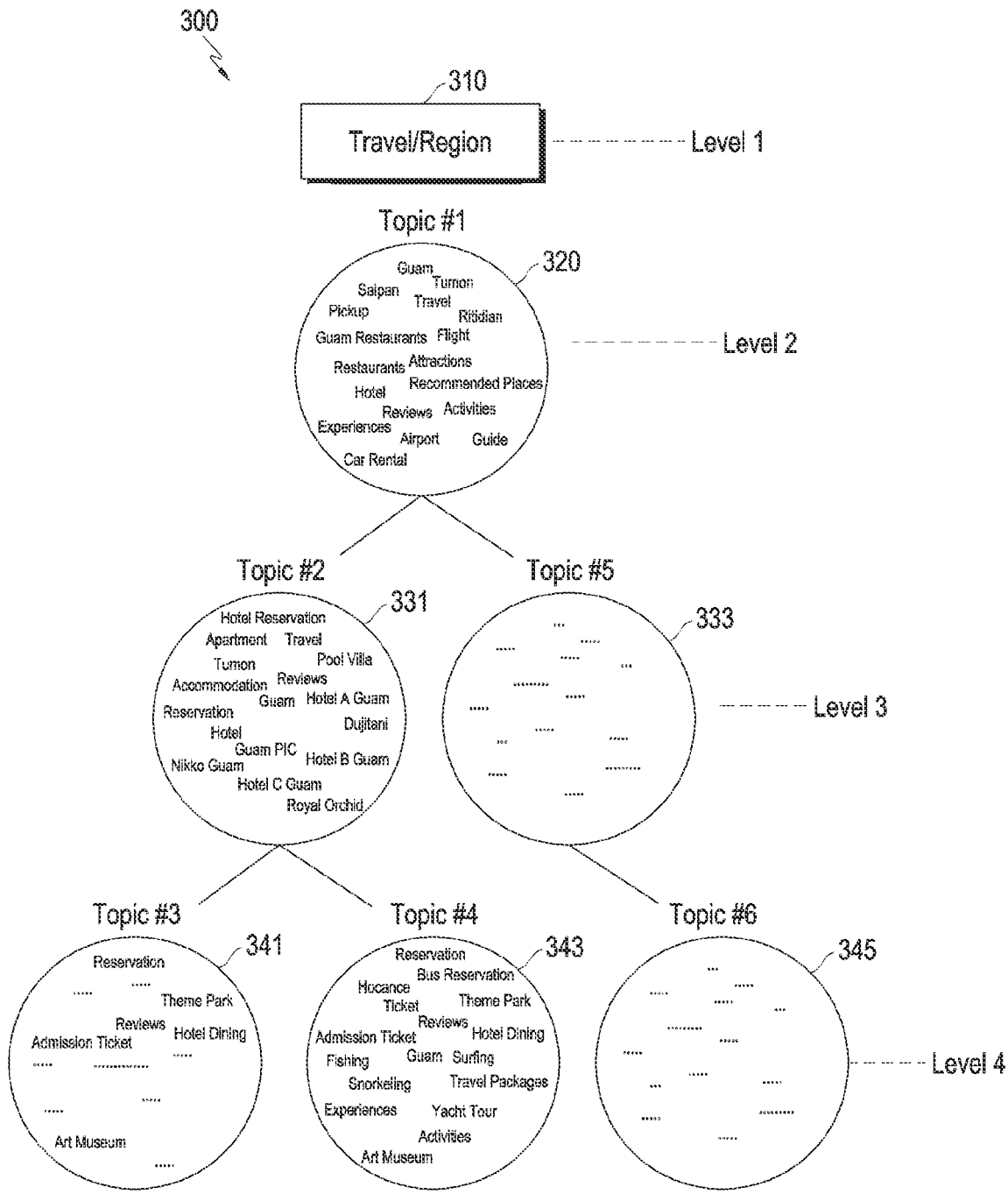
FIG. 3 is a diagram illustrating a hierarchical word graph, according to an embodiment.

FIG. 3 is a diagram 300 illustrating a hierarchical word graph 261, according to various embodiments.

Referring to FIG. 3, The hierarchical word graph 261 may be obtained (e.g., produced) in the server 108 using a technique of topic modelling (e.g., an LDA technique or an HDP technique). However, the topic modelling technique is not limited to the aforementioned LDA technique and HDP technique, and various topic modelling techniques may be used. The hierarchical word graph 261 obtained in the server 108 may be transmitted to the electronic device 101.

Although the hierarchical word graph 261 in FIG. 3 illustrates the case in which the highest category (e.g., the highest category in the hierarchical application category 263) is "Travel/Region 310", it is not limited thereto.

In the hierarchical word graph 261 in FIG. 3, topic IDs may be a group (or an identification ID of the group) including similar words (e.g., keywords). Some of the words may be included in a plurality of topic IDs (e.g., groups corresponding to a plurality of topic IDs).

The topic IDs (e.g., the groups corresponding to the topics and including words) may be classified hierarchically (or according to levels). Level 1 (the highest level) may be configured (e.g., assigned) for the highest category (or intent) in the hierarchical word graph 261 in FIG. 3. In the hierarchical word graph 261 in FIG. 3, level 2 may be configured for Topic #1 320 (e.g., Topic #1 (e.g., topic 1) indicates that the topic ID is 1), level 3 may be configured for Topic #2 331 and Topic #5 333, and level 4 may be configured for Topic #3 341, Topic #4 343, and Topic #6 345.

The level configured in the hierarchical word graph 261 may correspond (e.g., be mapped) to a score range of intent. For example, if the entire score range of intent is configured as 0 to 100, level 2 in the hierarchical word graph 261 may correspond to a score range of intent 60 to 70, level 3 in the hierarchical word graph 261 may correspond to a score range of intent 70 to 80, and level 4 in the hierarchical word graph 261 may correspond to a score range of intent 80 to 90. A threshold score configured for determining the intent (or compared with the score of candidate intent) may be the same as the lower limit score of the score of the intent corresponding to level 2 (e.g., intent score 50). However, a method of configuring the level of the hierarchical word graph 261 corresponding to the score of the intent is not limited to the above-described example.

The analysis module 240 may determine the level for the intent on the hierarchical word graph 261 on the basis of the intent and the score of the intent. For example, the analysis module 240 may determine a level corresponding to the score of the intent (e.g., a score range to which the score of the intent belongs), which is configured on the hierarchical word graph.

The analysis module 240 may determine the level and topic ID (the level and topic ID for intent) on the hierarchical word graph on the basis of the intent, the score of the intent, and a search word (e.g., the search word that has been input through a keyboard) (and/or a keyword obtained from the content included in the screen). For example, the analysis module 240 may determine a level on the hierarchical word graph 261 corresponding to the score of the intent (e.g., a score range to which the score of the intent belongs). The analysis module 240 may determine a group including words (e.g., one or more words in which the similarities between the words included in the search word and the group are greater than or equal to a specified similarity) similar to the search word (e.g., the search word that has been input through a keyboard) (and/or the keyword obtained from the content included in the screen) from among the groups of topic IDs corresponding to the determined level (e.g., groups corresponding to respective topic IDs and including words (or keywords)). The analysis module 240 may identify a topic ID corresponding to the determined group (e.g., a topic ID of the group including the one or more words), thereby determining the topic ID corresponding to the search word (e.g., the search word that has been input through a keyboard) (and/or the keyword obtained from the content included in the screen).

The analysis module 240 may determine the level (and/or topic ID) of an application using the hierarchical application category 263 on the basis of the application. Hereinafter, a method in which the analysis module 240 determines the level (and/or topic ID) of an application using the hierarchical application category 263 will be described in detail with reference to FIGS. 4A and 4B.

Figure 4A:
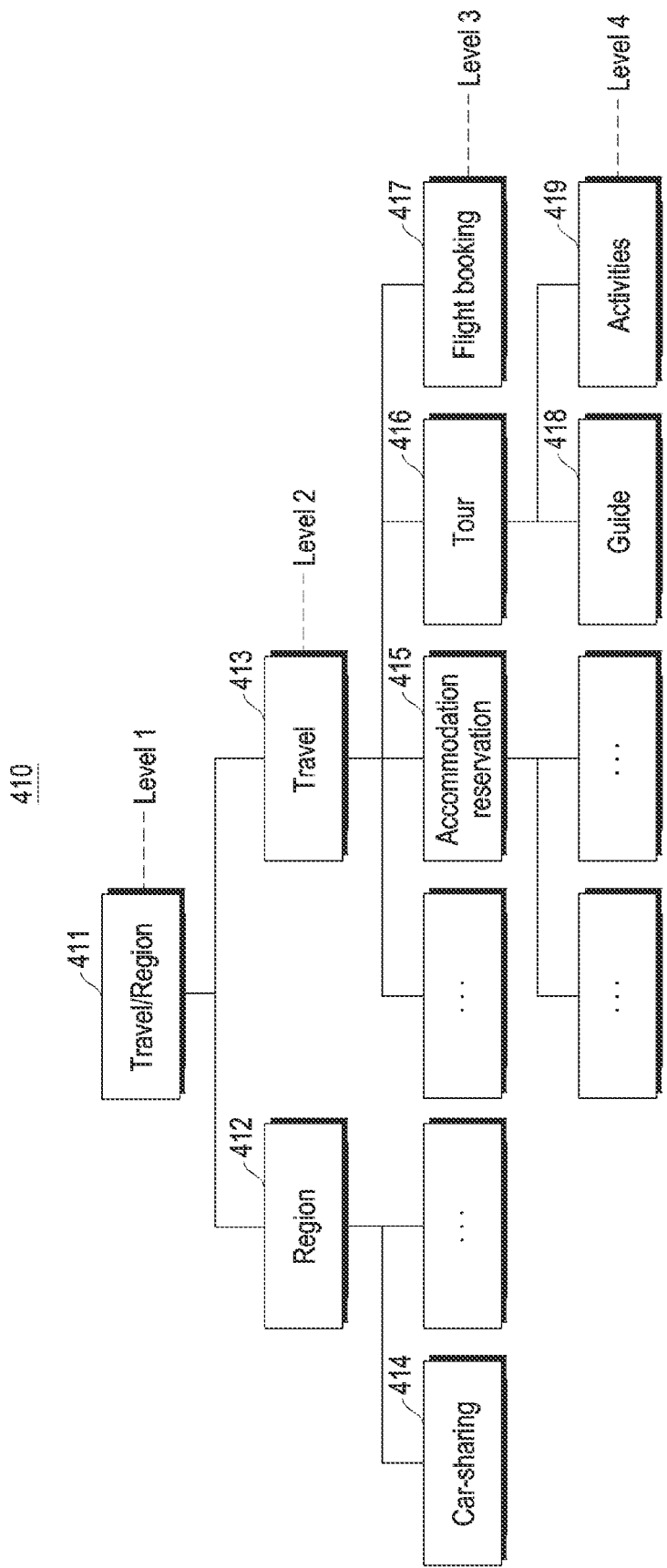

FIGS. 4A and 4B are diagrams 410 and 420 illustrating a hierarchical application category 263, according to various embodiments.

Referring to FIGS. 4A and 4B, the server 108 may produce a hierarchical application category 263, or the server 108 may receive, from another server, a hierarchical application category produced by the another server, thereby obtaining the hierarchical application category. The server 108 may update the hierarchical application category 263 that is produced by the server 108 or received from another server. A method of updating the hierarchical application category 263 will be described below with reference to FIG. 13.

FIG. 4A may show a hierarchical application category 263 in a tree form, and FIG. 4B may show a hierarchical application category 263 in a table form.

In the hierarchical application category 263 in FIG. 4A, the level of the highest category (e.g., Travel/Region 411) may be configured as level 1. The subcategories (e.g., Region 412 and Travel 413) of the highest category may be configured as level 2. The levels of subcategories (e.g., Car-sharing 414, Accommodation reservation 415, Tour 416, and/or Flight booking 417) of the subcategories (e.g., Region 412 and Travel 413) of level 2 may be configured as level 3. The levels of subcategories (e.g., Guide 418 and/or Activities 419) of the subcategories (e.g., Car-sharing 414, Accommodation reservation 415, Tour 416, and/or Flight booking 417) of level 3 may be configured as level 4.

The highest category of the hierarchical application category 263 may correspond to (e.g., may be the same as) the highest category of the hierarchical word graph 261. The levels configured in the hierarchical application category 263 may correspond to levels configured in the hierarchical word graph 261, respectively.

A highest category (e.g., category level 1), a level, a topic ID (e.g., the topic ID of the hierarchical word graph), an application ID, and/or a tag may be configured for applications (e.g., the names of applications) (or the main domains of webpages) stored (e.g., installed) in the electronic device 101. For example, as shown in FIG. 4B, for application 1, the highest category may be configured as Travel/Region, the level of application 1 may be configured as 2, a topic ID of application 1 may be configured as 1, an application ID may be configured as ID1, and a tag thereof may be configured as Travel. For application 2, the highest category may be configured as Travel/Region, the level of application 2 may be configured as 3, a topic ID of application 2 may be configured as 5, an application ID may be configured as ID2, and a tag thereof may be configured as Accommodation. For application 3, the highest category may be configured as Travel/Region, the level of application 3 may be configured as 4, a topic ID of application 3 may be configured as 3, an application ID may be configured as ID3, and a tag thereof may be configured as Reservation. The application ID may be code in the form of "com.sec.android.app.sbrowser" (e.g., an Internet browser application).

The levels and/or topic IDs configured in the applications stored in the electronic device 101 may be changed (e.g., updated). For example, the server 108 may obtain intent-related information from a plurality of electronic devices (e.g., a plurality of electronic devices subscribed (or registered) to the service provided by the server 108), and may update the hierarchical application category (e.g., the level and topic ID configured for each application) on the basis of the intent-related information. A method in which the server 108 updates the hierarchical application category will be described below with reference to FIG. 13. The server 108 may transmit the updated hierarchical application category to the electronic device 101. The server 108 may transmit an updated hierarchical word graph together with the updated hierarchical application category to the electronic device 101.

On the basis of the name of an executed application, the analysis module 240 may determine the level and/or the topic ID of the application using the hierarchical application category 263. For example, if it is identified that the name of an executed application is application 1, the analysis module 240 may determine level 2 corresponding (or mapped) to application 1 and topic 1 corresponding to application 1 as the level and the topic ID of the executed application using the hierarchical application category 263 in FIG. 4B.

The analysis module 240 may obtain (e.g., extract) a keyword from the content included in a screen using a content analysis model 265 stored in the DB 260. For example, the analysis module 240 may obtain a keyword from the content included in a screen using the content analysis model (e.g., a key word extraction algorithm) 265.

The recommendation module 250 may provide (e.g., recommend) a search word if an input for a search is detected.

The recommendation module 250 may obtain, from the event acquisition module 210, an event related to a user input to an input portion (e.g., a search window) for a search. If an event related to a user input to the input portion for a search is obtained, the recommendation module 250 may identify at least one group corresponding to the level (and/or topic ID) on the hierarchical word graph 261, which is determined through the analysis module 240. The recommendation module 250 may determine one or more words for recommendation from among the words included in the at least one identified group. For example, the recommendation module 250 may determine a specified number of words for recommendation from among the words included in the at least one identified group. In addition, the recommendation module 250 may determine one or more words similar to a previously searched search word (e.g., at least one search word that has been input for a search while the session is maintained or at least one search word that was most recently input for a search) from among the words included in the at least one identified group. The recommendation module 250 may determine one or more words similar to the search word that was previously input for a search from among the words included in the at least one identified group using a method for comparing the similarity between words (e.g., a method of calculating cosine similarity or Jaccard similarity in a vector space using term frequency-inverse document frequency (TF-IDF) or word embedding). Additionally, the recommendation module 250 may determine, from among the words included in the at least one identified group, one or more words similar to a previously obtained keyword (e.g., at least one keyword obtained from the content included in a screen while the session is maintained or at least one keyword obtained from the content included in a screen that is most recently displayed).

The recommendation module 250 may obtain text (e.g., a word, a morpheme, or alphabetic characters) for a search, which is input through the keyboard (or an electronic pen, or voice), from the event acquisition module 210. If the input text for a search is obtained, the recommendation module 250 may identify at least one group corresponding to the level (and/or topic ID) on the hierarchical word graph, which is determined through the analysis module 240. The recommendation module 250 may determine one or more words for recommendation from among the words included in the at least one identified group. For example, the recommendation module 250 may determine one or more words including the text for a search input through an input means (e.g., a keyboard, an electronic pen, or a microphone) from among the words included in the at least one identified group.

The recommendation module 250 may determine to recommend an application corresponding to the level (and/or topic ID) determined through the analysis module 240, as well as the one or more determined words. For example, if the level of a currently running application is determined to be level 2 through the analysis module 240, the recommendation module 250 may determine to recommend another application included in level 2 (or having a level of level 2) in the hierarchical application category.

The recommendation module 250 may display the one or more words and/or the application determined to be recommended through the display module 160. For example, the recommendation module 250 may display, through the display module 160, the one or more words and/or the application determined to be recommended so as to be adjacent to the input portion (e.g., a search window) for a search or display the same in a specified area of the keyboard. However, a method of displaying one or more words and/or an application determined to be recommended through the display module 160 is not limited to the above-described examples. The recommendation module 250 may output one or more words and/or an application determined to be recommended through a speaker.

A method in which the recommendation module 250 determines one or more words to be recommended will be described in more detail below with reference to FIGS. 6, 10, and 11.

The DB 260 may include a hierarchical word graph 261, a hierarchical application category 263, and/or a content analysis model 265. The hierarchical word graph 261, the hierarchical application category 263, and the content analysis model 265 have been described in detail above, so detailed descriptions thereof will be omitted.

The DB update module 270 may update the hierarchical word graph 261, the hierarchical application category 263, and/or the content analysis model 265 included in the DB 260. For example, when the electronic device 101 receives, from the server 108, a hierarchical word graph and/or a hierarchical application category, which have/has been updated in the server 108, the DB update module 270 may update the hierarchical word graph 261 and/or the hierarchical application category 263 included in the DB 260 using the updated hierarchical word graph and/or hierarchical application category.

Although, the event acquisition module 210, the session management module 220, the intent management module 230, the analysis module 240, the recommendation module 250, and the DB update module 270 are independent (or separate) modules in FIG. 2, they are not limited thereto. For example, at least two of the event acquisition module 210, session management module 220, intent management module 230, the analysis module 240, the recommendation module 250, or the DB update module 270 may be implemented as an integrated module.

Figure 5:
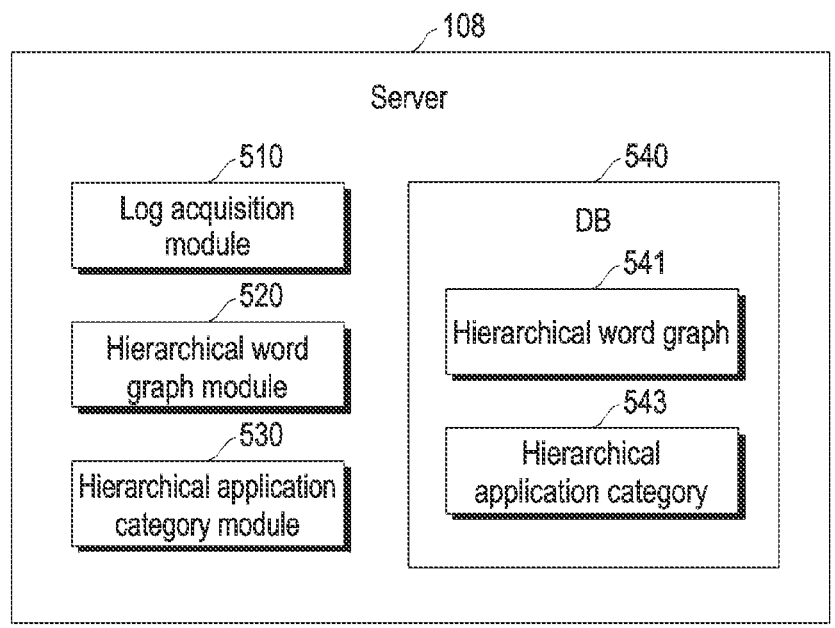
FIG. 5 is a block diagram illustrating a server, according to an embodiment.

FIG. 5 is a block diagram illustrating a server 108, according to an embodiment.

Referring to FIG. 5, the server 108 includes a log acquisition module 510, a hierarchical word graph module 520, a hierarchical application category module 530, and/or a DB.

The log acquisition module 510, the hierarchical word graph module 520, and/or the hierarchical application category module 530 may be executed by a processor of the server 108. For example, the log acquisition module 510, the hierarchical word graph module 520, and the hierarchical application category module 530 may be stored in a memory of the server 108 as software modules, and may be executed by the processor of the server 108 by loading the same. The DB 540 may be stored in the memory of the server 108. The server 108 may include a communication module (e.g., a communication circuit) for communicating with at least one external electronic device 101.

The log acquisition module 510 may obtain information about log data from one or more electronic devices in order to update the hierarchical word graph 541 and/or the hierarchical application category 543.

The log acquisition module 510 may obtain information about applications from one or more electronic devices or an external electronic device in order to update (and produce) the hierarchical word graph 541. For example, the server 108 may obtain information including at least one of a title of an application, a category of an application, or a tag related to an application (or a description of an application) from a server that provides the application (e.g., a server that stores an application such that the application is able to be downloaded to an electronic device).

The log acquisition module 510 may obtain information including a search word (e.g., a search word that has been used for a search in one or more electronic devices) from one or more electronic devices in order to update (and produce) the hierarchical word graph 541.

However, the information including a search word, which is obtained by the log acquisition module 510 from one or more electronic devices to update (and produce) the hierarchical word graph 541, is not limited to the above-described example. For example, the information including the search word may include a search word and a keyword obtained (e.g., extracted) from the content included in the execution screen o the application.

The log acquisition module 510 may obtain information including intent-related information from one or more electronic devices in order to update (and produce) the hierarchical application category 543. The intent-related information may include information about intent, a score of the intent, a search word, a keyword (e.g., a keyword obtained from the content included in a screen), the name and category of each application, and/or a category level, which are obtained from each of one or more electronic devices for a specified time.

The hierarchical word graph module 520 may update (and produce) the hierarchical word graph 541 on the basis of information including a search word obtained from one or more electronic devices and/or information about an application obtained from an external electronic device. For example, the hierarchical word graph module 520 may update the hierarchical word graph 541 on the basis of information including a search word obtained from one or more electronic devices and/or information about an application obtained from an external electronic device using a technique of topic modeling (e.g., an LDA technique or an HDP technique). A method in which the hierarchical word graph module 520 updates the hierarchical word graph 541 will be described below with reference to FIG. 12.

The hierarchical application category module 530 may update the hierarchical application category 543 on the basis of the intent-related information obtained from one or more electronic devices. A method in which the hierarchical application category module 530 updates the hierarchical application category 543 will be described below with reference to FIGS. 13 to 15B.

The DB 540 may include a hierarchical word graph 541 and a hierarchical application category 543. The hierarchical word graph 541 and the hierarchical application category 543 have been described above with reference to FIGS. 3 and 4, so descriptions thereof will be omitted.

If a request for a hierarchical word graph 541 and/or a hierarchical application category 543 is received from the electronic device 101, the server 108 may transmit a hierarchical word graph 541 and a hierarchical application category 543 to the electronic device 101 through a communication module. For example, if an application is newly installed in the electronic device 101 or if the memory 130 has no information about a webpage accessed by the electronic device 101, the electronic device 101 may transmit, to the server 108, a request for a hierarchical word graph 541 and/or a hierarchical application category 543 related to the newly installed application or the webpage through the communication module 190. However, the disclosure is not limited thereto, and the server 108 may periodically transmit the hierarchical word graph 541 and the hierarchical application category 543 to the electronic device 101 through the communication module. The electronic device 101 may update the hierarchical word graph 261 and the hierarchical application category 263 stored in the DB 260 on the basis of the hierarchical word graph 541 and the hierarchical application category 543 periodically received from the server 108.

An electronic device 101 may include a display module 160, at least one processor 120 operably connected to the display module 160, and a memory 130 operably connected to the at least one processor 120 and configured to store a hierarchical word graph including a plurality of groups classified by a plurality of levels, wherein the memory 130 may store instructions configured to cause, when executed, the at least one processor 120 to obtain an event while an application is executed, determine an intent and a score of the intent based on the event, identify a level corresponding to the score of the intent from among the plurality of levels based on the intent and the score of the intent, determine one or more words from among words included in at least one group corresponding to the identified level, among the plurality of groups, based on an input for a search being detected, and display the one or more determined words through the display module 160.

The instructions may be configured to cause the at least one processor 120 to detect candidate intent based on the event, and, based on a score for the candidate intent being greater than or equal to a threshold score, determine the candidate intent as the intent.

The instructions may be configured to cause the at least one processor 120 to identify the level and topic ID in the hierarchical word graph 261 based on the intent, the score of the intent, a search word obtained while the application is executed, and a keyword obtained while the application is executed.

The instructions may be configured to cause the at least one processor 120 to determine the one or more words from among the words included in the at least one group corresponding to the level identified in the hierarchical word graph 261 based on an input to an input portion for a search being detected.

The instructions may be configured to cause the at least one processor 120 to, based on an input to the input portion for a search being detected, obtain a search word inputted while the intent is maintained and/or a keyword obtained from content displayed through the display module 160 while the intent is maintained, identify a similarity between the search word and/or the keyword and the words included in the at least one group, and determine the one or more words having a similarity greater than or equal to a specified similarity from among the words.

The instructions may be configured to cause the at least one processor 120 to, based on a text being inputted through a keyboard, determine the one or more words including the text from among words included in at least one group corresponding to the level identified in the hierarchical word graph 261.

The memory may further include a hierarchical application category 263 in which a level is set for each of the categories of a plurality of applications, and the instructions may be configured to cause the at least one processor 120 to identify the level using the hierarchical application category 263 based on a name of the application.

The instructions may be configured to cause the at least one processor 120 to display, through the display module 160, an application having a same level as the level in the hierarchical application category 263 together with the one or more determined words.

The electronic device 101 may further include a communication module 190, and the instructions may be configured to cause the at least one processor 120 to transmit, to the server 108 through the communication module 190, information including at least one of intent, a score of the intent, a name of an application, a category of an application, a topic ID of an application, or a keyword, which are obtained for a specified time, and receive, from the server 108 through the communication module 190, a hierarchical application category updated by the server 108 based on the information.

The intent may be a category of the highest levels of the hierarchical word graph 261 and the hierarchical application category 263.

Figure 6:
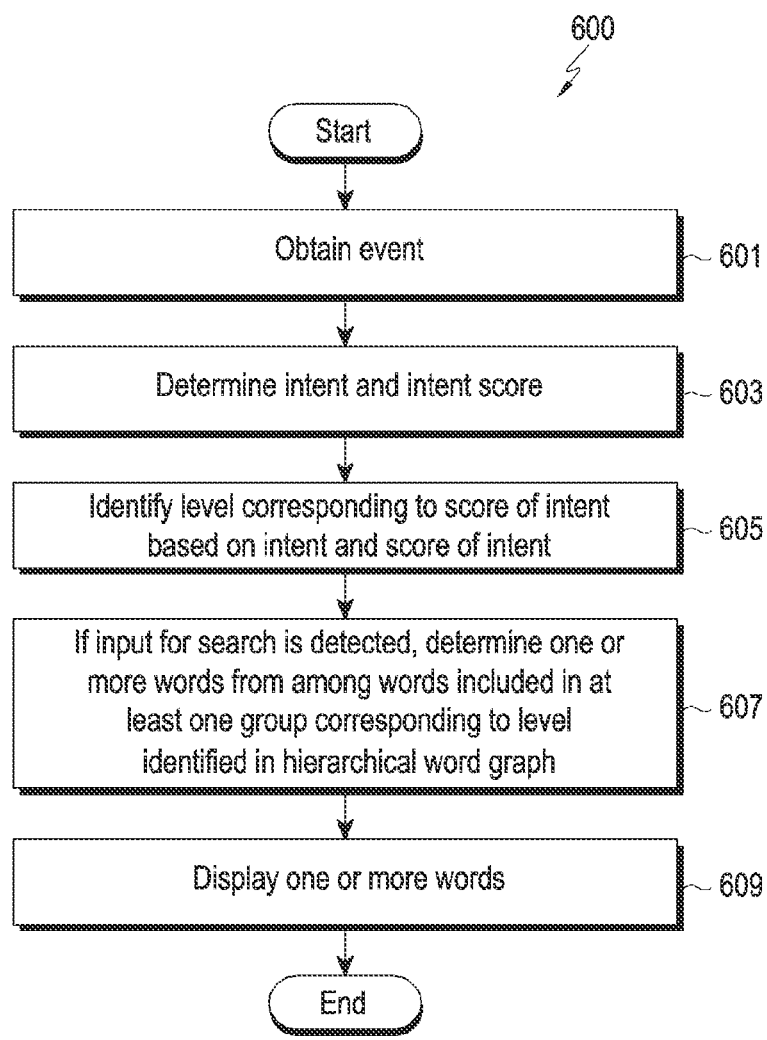
FIG. 6 is a flowchart illustrating a method of providing a search word, according to an embodiment.

FIG. 6 is a flowchart 600 illustrating a method of providing a search word, according to an embodiment.

Referring to FIG. 6, in step 601, the processor 120 obtains an event while an application is running.

The processor 120 may obtain an application switch event. For example, while a first application is running, the processor 120 may obtain (or receive) an event for executing a second application different from the first application (or an event indicating that the second application is to be executed). In addition, the processor 120 may obtain an event for executing the first application in the background and executing the second application in the foreground on the basis of a user input for executing the second application while a first application is running. The processor 120 may obtain, as information related to an application switch event, information about an application before an application switch (e.g., the name and category of an application before an application switch) and information about an application after the switch (e.g., the name and category of an application after the application switch).

The application switch event may include an event for switching a webpage (e.g., a web site, a domain, or a blog) by a web application (or a web browser) in addition to the event indicating that the application is to be switched. For example, the application switch event may include an event for displaying a second webpage (e.g., a second main domain or a second high-level domain), which is different from a first webpage (e.g., a first main domain or a first high-level domain), from the first webpage. The processor 120 may obtain, as information related to an event for switching a webpage, information about a webpage before a webpage switch (e.g., the address and category of a webpage before a webpage switch) and information about a webpage after a webpage switch (e.g., the address and category of a webpage after a webpage switch).

The processor 120 may obtain a screen switch event. For example, the processor 120 may obtain an event for displaying a screen that is different from the screen displayed through the display module 160 on the basis of a user input to an object (e.g., an icon or a button) included in the screen displayed while an application is running.

The screen switch event may include an event for switching the screen of a webpage. For example, the event for switching the screen of a webpage may include an event for displaying a second webpage (e.g., a second subdomain or a second low-level domain), which is different from a first webpage (e.g., a first subdomain or a first low-level domain) and has the same main domain (or high-level domain) as the first webpage, from the first webpage.

The processor 120 may obtain a search word input event. For example, the processor 120 may obtain an event for inputting a search word (or an event indicating that the search word is to be input) on the basis of a user input to a keyboard. The processor 120 may obtain a search word that is input through a keyboard as information related to a search word input event.

The processor 120 may include various events input while an application is running. For example, the processor 120 may obtain an event related to an input to the screen (e.g., a touch input to the screen or a click input to the screen) while an application is running. In addition, the processor 120 may obtain an event related to scroll on the screen (e.g., information about the number of scrolls on the screen and/or a speed of scrolling on the screen) while an application is running. Additionally, the processor 120 may obtain an event related to the time at which an application is running (e.g., information about the elapsed time after an application is executed or after the screen of an application is displayed).

The processor 120 may obtain information related to context. The processor 120 may obtain, as the information related to context, information about at least one of a current time, a place where the electronic device 101 is located, or an occasion. For example, the processor 120 may obtain information indicating that the user of the electronic device 101 is moving by bus in the evening on the basis of the current time, the place where the electronic device 101 is located, and the user's history of using the electronic device 101. However, the information related to context is not limited to the above-described example.

In step 603, the processor 120 determines intent and an intent score.

Hereinafter, a method in order for the processor 120 to determine intent will be described with reference to FIG. 7.

Figure 7:
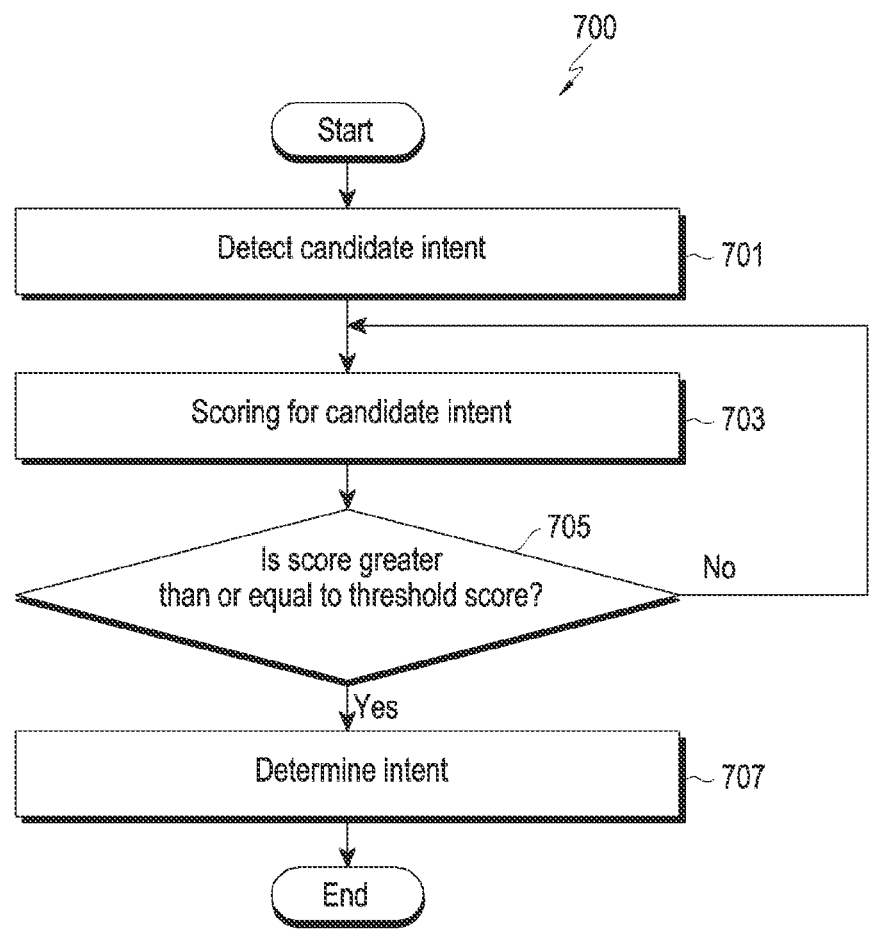
FIG. 7 is a flowchart illustrating a method of determining intent, according to an embodiment.

FIG. 7 is a flowchart 700 illustrating a method of determining intent, according to an embodiment.

Referring to FIG. 7, in step 701, the processor 120 detects (or recognizes) candidate intent.

The processor 120 may detect candidate intent by identifying the highest category of an application that is currently executed (e.g., that is running). For example, the processor 120 may identify a name of the currently running application and detect, as candidate intent, the highest category of the category to which the name of the currently running application belongs on the hierarchical application category 263.

The processor 120 may detect candidate intent on the basis of information obtained from the screen of an application. For example, the processor 120 may obtain a keyword from the content included in the screen displayed through the display module 160. The processor 120 may detect, as candidate intent, the highest category of a group (or topic ID) including the obtained keyword (or including words similar to the obtained keyword) (e.g., a category corresponding to the highest level of the level corresponding to the group including the obtained keyword) in the hierarchical word graph 261.

The processor 120 may detect candidate intent on the basis of a search word input by the user. For example, the processor 120 may obtain an input search word. The processor 120 may detect, as candidate intent, the highest category of a group including the obtained search word (or including words similar to an obtained keyword) in the hierarchical word graph 261.

In step 703, the processor 120 performs scoring on the candidate intent.

The processor 120 may perform scoring on the candidate intent on the basis of an event (and information related to the event) obtained while the application is running.

For example, the processor 120 may perform scoring on the candidate intent on the basis of an application switch event. If a second application (e.g., a currently running application) is executed after a first application is executed, the processor 120 may detect candidate intent on the basis of the second application or a screen displayed by executing the second application. If the highest category of the first application is the same as the highest category of the second application, the processor 120 may identify a level of the first application (e.g., a level corresponding to the category of the first application in the hierarchical application category 263) and a level of the second application (e.g., a level corresponding to the category of the second application in the hierarchical application category 263). If the level of the second application is higher than or equal to the level of the first application, the processor 120 may increase a score for the candidate intent. If the level of the second application is less than the level of the first application, the processor 120 may reduce a score for the candidate intent.

In addition, the processor 120 may perform scoring on the candidate intent on the basis of a screen switch event. The processor 120 may obtain a first keyword by analyzing the content included in a first screen before a screen switch. The processor 120 may obtain a second keyword by analyzing the content included in a second screen after the screen switch. If the level corresponding to a group (e.g., a topic ID) including the second keyword (or including words similar to the obtained keyword) is higher than or equal to the level corresponding to a group including the first keyword in the hierarchical word graph 261, the processor 120 may increase a score of the detected candidate intent. If the level corresponding to a group including the second keyword is less than the level corresponding to a group including the first keyword in the hierarchical word graph 261, the processor 120 may reduce a score of the detected candidate intent.

Additionally, the processor 120 may perform scoring on the candidate intent on the basis of an obtained search word. The processor 120 may increase the score for candidate intent related to the search word as the number of times the search word is input (e.g., the number of times a search for the search word is performed after the search word is input) increases.

In addition, the processor 120 may perform scoring on the candidate intent on the basis of an event input while an application is running. The processor 120 may increase the score for candidate intent as touch inputs to the screen (or click inputs to the screen), a dwell time on the screen, and/or the number of scroll inputs to the screen increase. The processor 120 may increase the score for candidate intent as the time during which the application is running increases.

The processor 120 may differently configure the degree, speed, or weight of increasing (or reducing) the score when scoring the candidate intent.

The processor 120 may differently configure the degree of increasing the score for candidate intent on the basis of the difference between the level corresponding to an application before an application switch and the level corresponding to an application after the application switch. For example, assuming that the level of a first application before an application switch is level 2, the processor 120 may configure the degree of increasing the score for candidate intent to be greater in the case where the level of a second application after the application switch is level 4 than in the case where the level of the second application after the application switch is level 3.

The processor 120 may differently configure the degree of increasing the score for candidate intent, when switching a screen, on the basis of the difference between the level obtained on the basis of the content included in a screen before the screen switch (e.g., the level corresponding to a group including a keyword obtained from the content included in the screen in the hierarchical word graph 261) and the level obtained on the basis of the content included in a screen after the screen switch.

In connection with an input to the screen displayed after a search word is input (e.g., in the case where one piece of content is selected by the user from among multiple pieces of content (e.g., links to content) searched for through the search word input, the execution screen for the one piece of selected content), the processor 120 may configure the degree of increasing the score for candidate intent to be greater for an input to the screen displayed after the search word input (for example, by performing a search for the search word after the search word input) than for an input to the screen displayed before the search word input.

The processor 120 may configure the degree of increasing the score for candidate intent to be greater as the speed of scrolling on the screen is reduced. The processor 120 may configure the degree of increasing the score for candidate intent to be smaller as the speed of scrolling on the screen increases. The processor 120 may configure the degree of increasing the score for candidate intent to be greater as a dwell time on the screen (e.g., the execution screen of an application) increases. The processor 120 may configure the degree of increasing the score for candidate intent to be smaller as a dwell time on the screen (e.g., the execution screen of an application) is reduced.

In step 705, the processor 120 determines whether or not the score for candidate intent is greater than or equal to a threshold score.

The processor 120 may determine (or adjust) a threshold score on the basis of a variety of information. For example, the processor 120 may determine a threshold score on the basis of context information. The processor 120 may obtain information indicating that the user of the electronic device 101 is moving by bus in the evening. When candidate intent related to an application used by a plurality of users while moving by bus in the evening is detected, the processor 120 may adjust a threshold score of the detected candidate intent to be lower. In addition, if candidate intent related to a recent trend, a current season, and/or a user's life pattern is detected, the processor 120 may adjust a threshold score of the detected candidate intent to be lower. However, the method of determining the threshold score is not limited to the above-described example.

If the score for candidate intent is less than the threshold score in step 705, the scoring operation may be continuously performed on the candidate intent in step 703.

If the candidate intent score is greater than or equal to the threshold score in step 705, then in step 707, the processor 120 determines (or confirms) the candidate intent as the intent.

In addition, the processor 120 may continue to perform scoring on the determined intent after the intent is determined. For example, after the intent is determined, the processor 120 may perform the scoring operation for the determined intent, at least in part, in the same or similar manner as the above-described scoring operation for the candidate intent.

Referring back to FIG. 6, if the intent is determined, the processor 120 may produce a session for the intent. The processor 120 may maintain the session if an event related to the intent occurs within a specified time after producing the session for the intent. The processor 120 may release the session if an event related to the intent does not occur for a specified time after producing the session for the intent.

The processor 120 may determine the state of the intent. For example, the processor 120 may determine the state of the intent to be new entry, retention, switching, re-entry, or discarding on the basis of information on the session (e.g., the state of the session) and the obtained event (and information related to the event). A method of determining the state of the intent will be described below in detail with reference to FIGS. 8 and 9.

In step 605, the processor 120 identifies a level corresponding to the score of the intent on the basis of the intent and the score of the intent.

The processor 120 may determine a level for the intent on the hierarchical word graph 261 on the basis of the intent and the score of the intent. For example, the processor 120 may determine a level corresponding to the score of the intent (e.g., a score range to which the score of the intent belongs) configured on the hierarchical word graph 261.

The processor 120 may determine a level and a topic ID for the intent on the hierarchical word graph on the basis of the intent, the score of the intent, and a search word (e.g., an input search word) (and/or a keyword obtained from the content included in the screen). For example, the processor 120 may determine a level configured on the hierarchical word graph corresponding to the score of the intent (e.g., a score range to which the score of the intent belongs). The processor 120 may determine a group including words (e.g., one or more words in which the similarities between the words included in the search word and the group are greater than or equal to a specified similarity) similar to a search word that has been input through a keyboard (and/or a keyword obtained from the content included in the screen) from among the groups of topic IDs corresponding to the determined level (e.g., groups corresponding to respective topic IDs and including words (or keywords)). The processor 120 may identify a topic ID corresponding to the determined group (e.g., a topic ID of the group including one or more words), thereby determining the topic ID corresponding to the search word (e.g., the input search word) (and/or a keyword obtained from the content included in the screen).

The processor 120 may determine the level (and/or topic ID) of an application using the hierarchical application category 263 on the basis of the application.

The processor 120 may determine the level and topic ID of an application using the hierarchical application category 263 on the basis of the name of an executed application. For example, if it is identified that the name of an executed application is application 1, the processor 120 may determine level 2 corresponding to (or mapped to) application 1 and topic 1 corresponding to application 1 as the level and topic ID of the executed application using the hierarchical application category 263.

In step 607, if an input for a search is detected, the processor 120 determines one or more words from among the words included in at least one group corresponding to the level identified in the hierarchical word graph.

The processor 120 may obtain an event related to a user input to an input portion (e.g., a search window) for a search. For example, the processor 120 may obtain a user input of touching (or clicking) an input portion for a search.

If an event related to a user input to the input portion for a search is obtained, the processor 120 may identify at least one group corresponding to the level (and/or topic ID) corresponding to the score of the intent on the hierarchical word graph 261. For example, the processor 120 may identify the level (and topic ID) on the hierarchical word graph 261 on the basis of the intent and the score of the intent (and the search word and/or the keyword previously used for a search). The processor 120 may identify at least one group corresponding to the identified level (and topic ID) and including a plurality of words. In addition, the processor 120 may identify the name of the currently running application. The processor 120 may identify a level and/or a topic ID corresponding to (e.g., mapped to) the identified name of the application on the hierarchical application category 263. The processor 120 may identify at least one group corresponding to the identified level and/or topic ID.

The processor 120 may determine one or more words for recommendation from among the words included in the at least one identified group.

The processor 120 may determine, as one or more words for recommendation, a specified number of words for recommendation from among the words included in the at least one identified group.

The processor 120 may determine one or more words similar to a previously searched search word (e.g., at least one search word that has been input for a search while the session is maintained or at least one search word that was most recently input for a search) from among the words included in the at least one identified group. The processor 120 may determine one or more words similar to the previously searched search word from among the words included in the at least one identified group using a method for comparing the similarity between words (e.g., a method of calculating cosine similarity or Jaccard similarity in a vector space using TF-IDF or word embedding). If at least one group identified on the basis of the intent and the score of the intent (e.g., at least one group corresponding to the level identified on the basis of the intent and the intent score) and at least one group identified on the basis of the name of the currently running application (e.g., at least one group corresponding to the level mapped to the name of the currently running application on the hierarchical application category 263) are different, the processor 120 may determine one or more words similar to the previously searched search word from among the words included in at least one group identified on the basis of the intent and the score of the intent. If it is determined that there is no word similar to the previously searched search word among the words included in at least one group identified on the basis of the intent and the score of the intent, the processor 120 may determine one or more words similar to the previously searched search word from among the words included in at least one group identified on the basis of the name of the currently running application.

Additionally, the processor 120 may determine one or more words similar to the previously searched search word from among the words included in at least one group identified on the basis of the name of the currently running application. If it is determined that there is no word similar to the previously searched search word among the words included in the at least one group identified on the basis of the name of the currently running application, the processor 120 may determine one or more words similar to the previously searched search word from among the words included in at least one group identified on the basis of the intent and the score of the intent. If it is determined that there is no word similar to the previously searched search word among the words included in at least one group identified on the basis of the intent and the score of the intent and among the words included in the at least one group identified on the basis of the name of the currently running application, the processor 120 may determine one or more words similar to the previously searched search word from among the words included in at least one group corresponding to a level (and/or topic ID) adjacent to (or hierarchically connected to) the identified level (and/or topic ID) in the hierarchical word graph 261 (e.g., in FIG. 3, if the identified topic ID is topic 2, topic 1 as a higher topic of topic 2 and/or topic 3 as a lower topic of topic 2).

The processor 120 may determine one or more words similar to a previously obtained keyword (e.g., at least one keyword obtained from the content included in the screen while the session is maintained or at least one keyword obtained from the content included in the most recently displayed screen) from among the words included in the at least one identified group.

The processor 120 may obtain input text (e.g., a word, a morpheme, or alphabetic characters) for a search. For example, in the case where the search word desired by the user is "Guam", the processor 120 may obtain "Gua" as text to search for "Guam" (e.g., only an initial consonant and a media vowel are entered, among the initial consonant, the medial vowel, and the final consonant).

If the text for a search input through a keyboard is obtained, the processor 120 may identify at least one group corresponding to the level (and/or topic ID) on the hierarchical word graph 261. For example, if the text for a search input through a keyboard is obtained, the processor 120 may identify at least one group on the hierarchical word graph 261 on the basis of the intent and the score of the intent. In addition, if the text for a search input through a keyboard is obtained, the processor 120 may identify at least one group on the hierarchical word graph 261 on the basis of the name of a currently running application.

The processor 120 may determine one or more words including the text for a search input through a keyboard from among the words included in at least one identified group. If at least one group identified on the basis of the intent and the score of the intent (e.g., at least one group corresponding to the level identified on the basis of the intent and the intent score) and at least one group identified on the basis of the name of the currently running application (e.g., at least one group corresponding to the level mapped to the name of the currently running application on the hierarchical application category) are different, the processor 120 may determine one or more words including the text for a search input through a keyboard from among the words included in at least one group identified on the basis of the intent and the score of the intent. If it is determined that there is no word including the text for a search input through a keyboard among the words included in at least one group identified on the basis of the intent and the score of the intent, the processor 120 may determine one or more words including the text for a search input through a keyboard from among the words included in at least one group identified on the basis of the name of the currently running application.

In addition, the processor 120 may determine one or more words including the text for a search input through a keyboard from among the words included in at least one group identified on the basis of the name of the currently running application. If it is determined that there is no word including the text for a search input through a keyboard among the words included in at least one group identified on the basis of the name of the currently running application, the processor 120 may determine one or more words including the text for a search input through a keyboard from among the words included in at least one group identified on the basis of the intent and the score of the intent. If it is determined that there is not one or more words including the text for a search input through a keyboard among the words included in at least one group identified on the basis of the intent and the score of the intent and among the words included in at least one group identified on the basis of the name of the currently running application, the processor 120 may determine one or more words including the text for a search input through a keyboard from among the words included in at least one group corresponding to a level (and/or topic ID) adjacent to (or hierarchically connected to) the identified level (and/or topic ID) in the hierarchical word graph 261 (e.g., in FIG. 3, if the identified topic ID is topic 2, topic 1 as a higher topic of topic 2 and/or topic 3 as a lower topic of topic 2).

The processor 120 may recommend one or more words determined on the basis of the aforementioned event related to a user input to the input portion (e.g., a search window) for a search together with one or more words determined on the basis of the text for a search input through a keyboard.

The processor 120 may recommend an application corresponding to the determined level (and/or topic ID) in addition to the one or more determined words. For example, in the case where the level of the currently running application is determined to be level 2, the processor 120 may recommend another application included in level 2 (or having a level of level 2) in the hierarchical application category.

In step 609, the processor 120 displays the one or more words determined in step 607 (and information about the application determined to be recommended) through the display module 160. For example, the processor 120 may display, through the display module 160, the one or more words and/or the application determined to be recommended so as to be adjacent to the input portion (e.g., a search window) for a search or display the same in a specified area of the keyboard. However, a method of displaying one or more words and/or an application determined to be recommended through the display module 160 is not limited to the above-described examples.

FIG. 6 illustrates that one or more words are determined from among the words included in at least one group corresponding to the level identified in the hierarchical word graph 261 when an input for a search is detected. In addition, the processor 120 may detect an input for a search after the intent and the score of the intent may be determined in step 603. If the input for a search is detected, the processor 120 may perform steps 605 to 609.

Figure 8:
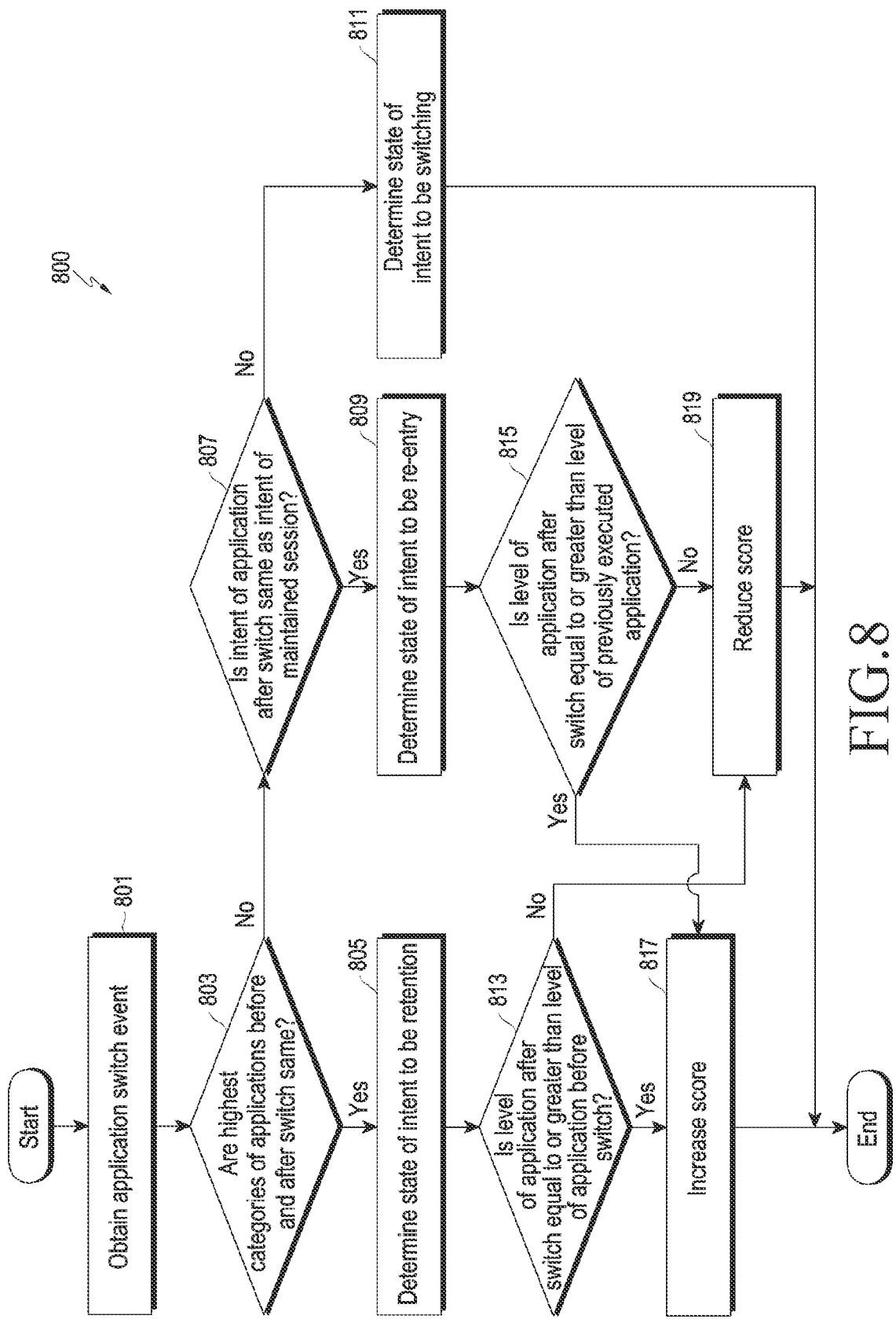
FIG. 8 is a flowchart illustrating a method of determining a score of intent on the basis of an application switch event, according to an embodiment.

FIG. 8 is a flowchart 800 illustrating a method of determining a score of intent on the basis of an application switch event, according to an embodiment.

Referring to FIG. 8, in step 801, the processor 120 obtains an application switch event. The method in which the processor 120 obtains the application switch event has been described in detail above, so a detailed description of step 801 will be omitted.

In step 803, the processor 120 identifies whether or not the highest categories of the applications before and after an application switch (e.g., a category of the highest level of the hierarchical word graph or a category of the highest level of the hierarchical application category) are the same.

If the highest categories of the applications before and after the application switch are the same in step 803, then in step 805, the processor 120 determines the state of the intent to be "maintenance".

If the highest categories of the applications before and after the application switch are not the same (are different) in step 803, then the processor 120 identifies whether or not the intent of the application after the application switch is the same as the intent of the session that is maintained in step 807.

If the intent of the application after the application switch is the same as the intent of the session that is maintained in step 807, then the processor 120 determines the state of the intent to be "re-entry" in step 809.

If the intent of the application after the application switch is different from the intent of the session that is maintained in step 807, the processor 120 determines the state of the intent to be "switching" in step 811. In addition, if it is identified that the maintained session does not exist after the application switch (e.g., if no intent is produced (or confirmed) by execution of the application before the application switch), the processor 120 may determine the state of the intent as "new entry".

In step 813, the processor 120 determines whether the level of the application after the application switch is greater than or equal to the level of the application before the application switch.

If the level of the application after the application switch is greater than or equal to the level of the application before the application switch in step 813, then the processor 120 increases the score of the intent in step 817.

If the level of the application after the application switch is less than the level of the application before the application switch in step 813, then the processor 120 reduces the score of the intent in the maintained state in step 819.

When switching an application, the processor 120 may differently configure the degree of increasing the score for candidate intent (and/or information that increases the score for candidate intent) on the basis of the difference between the level corresponding to an application before the application switch and the level corresponding to an application after the application switch. For example, assuming that the level of a first application before an application switch is level 2, the processor 120 may configure the degree of increasing the score for candidate intent to be greater in the case where the level of a second application after the application switch is level 4 than in the case where the level of the second application after the application switch is level 3.

In step 815, the processor 120 identifies whether the level of the application after the application switch is higher than or equal to the level of a previously executed application. For example, the processor 120 may determine whether the level of the application after the application switch is higher than or equal to the level of the application whose highest category is the same as the highest category of the application after the application switch and that has been executed last while the session of the re-entered intent is maintained.

If the level of the application after the application switch is higher than or equal to the level of the previously executed application in step 815, then the processor 120 increases the score of the intent that is in the re-entry state in step 817.

If the level of the application after the application switch is less than the level of the previously executed application in step 815, then the processor 120 reduces the score of the intent that is in the re-entry state in step 819.

Figure 9:
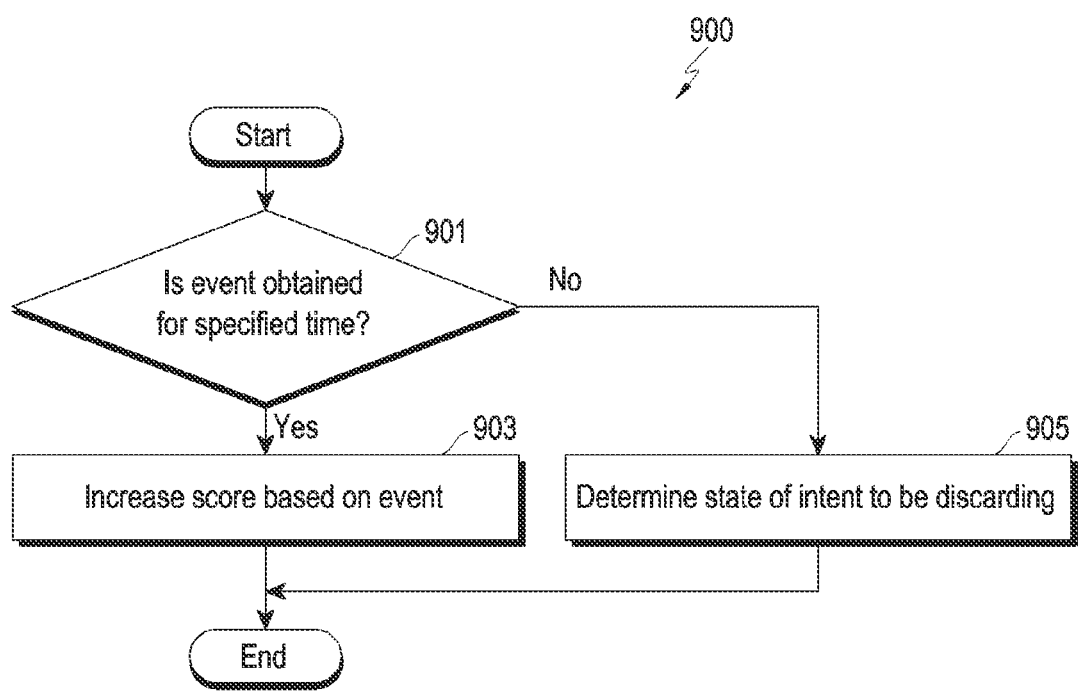
FIG. 9 is a flowchart illustrating a method of determining a score of intent on the basis of an input to a screen, according to an embodiment.

FIG. 9 is a flowchart 900 illustrating a method of determining a score of intent on the basis of an input to a screen, according to an embodiment.

Referring to FIG. 9, in step 901, the processor 120 determines whether or not an event is obtained for a specified time.

The processor 120 may identify whether or not an event due to an input to the execution screen of an application is obtained within a specified time from the time at which the last input to the execution screen of the application is detected after determining the intent while the application is running.

If an event is obtained for a specified time in step 901, then the processor 120 increases the score of the intent on the basis of the event in step 903.

The processor 120 may increase the score of the intent on the basis of an obtained search word. The processor 120 may increase the score for the intent as the number of times a search word is input (e.g., the number of times searching for a search word is performed after the search word is input) increases.

The processor 120 may increase the score for the intent as touch inputs to the screen (or click inputs to the screen) and/or the number of scroll inputs to the screen increase.

The processor 120 may increase the score for the intent as the time during which the application is running increases.

In connection with an input to the screen displayed after a search word is input (e.g., in the case where one piece of content is selected by the user from among multiple pieces of content (e.g., links to content) searched for through the search word input, the execution screen for the one piece of selected content), the processor 120 may configure the degree of increasing the score for candidate intent to be greater for an input to the screen displayed after the search word input than for an input to the screen displayed before the search word input.

The processor 120 may increase the degree of increasing the score for candidate intent as the speed of scrolling on the screen is reduced. The processor 120 may reduce the degree of increasing the score for candidate intent as the speed of scrolling on the screen increases.

If no event is obtained for a specified time in step 901, then the processor 120 determines the state of the intent to be discarding in step 905. If no event is obtained for a specified time, the processor 120 may release the maintained session.

Figure 10:
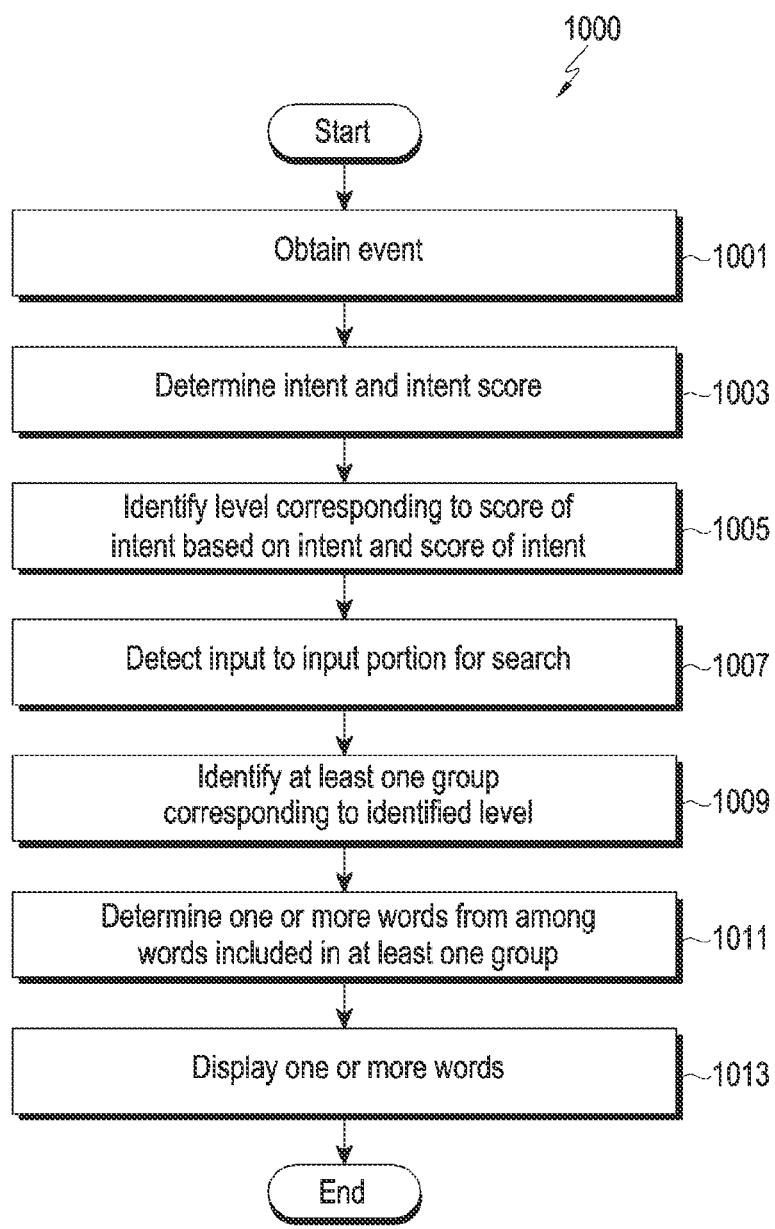
FIG. 10 is a flowchart illustrating a method of providing a search word in the case where an input to an input portion for a search is detected, according to an embodiment.

FIG. 10 is a flowchart 1000 illustrating a method of providing a search word in the case where an input to an input portion for a search is detected, according to an embodiment.

Referring to FIG. 10, in step 1001, the processor 120 obtains an event while an application is running.

In step 1003, the processor 120 determines intent and an intent score.

In step 1005, the processor 120 identifies a level corresponding to the score of the intent on the hierarchical word graph 261 on the basis of the intent and the score of the intent.

Since the examples of steps 1001 to 1005 are at least partially the same as or similar to the examples of steps 601 to 605 in FIG. 6, detailed descriptions thereof will be omitted.

In step 1007, the processor 120 detects an input to an input portion for a search.

The processor 120 may obtain an event related to a user input to an input portion (e.g., a search window) for a search. For example, the processor 120 may obtain a user input of touching (or clicking) the input portion for a search.

In step 1009, the processor 120 identifies at least one group corresponding to the level identified in step 1005.

If an event related to the user input to the input portion for a search is obtained, the processor 120 may identify at least one group corresponding to (or belonging to) the level (and/or topic ID) corresponding to the score of the intent on the hierarchical word graph. For example, the processor 120 may identify a level (and/or a topic ID) corresponding to the score of the intent on the basis of the intent and the score of the intent (and the search word and/or keyword previously used for a search). The processor 120 may identify at least one group corresponding to the identified level (and topic ID) and including a plurality of words. In addition, the processor 120 may identify the name of a currently running application. The processor 120 may identify the level and/or topic ID corresponding to (e.g., mapped to) the identified name of the application on the hierarchical application category. The processor 120 may identify at least one group corresponding to the identified level and/or topic ID.

In step 1011, the processor 120 determines one or more words for recommendation from among the words included in at least one group.

The processor 120 may determine, as one or more words for recommendation, a specified number of words for recommendation from among the words included in the at least one identified group.

The processor 120 may determine one or more words similar to a previously searched search word (e.g., at least one search word that has been input for a search while the session is maintained or at least one search word that was most recently input for a search) from among the words included in the at least one identified group. The processor 120 may determine one or more words similar to the previously searched search word from among the words included in the at least one identified group using a method for comparing the similarity between words (e.g., a method of calculating cosine similarity or Jaccard similarity in a vector space using TF-IDF or word embedding). If at least one group identified on the basis of the intent and the score of the intent (e.g., at least one group corresponding to the level identified on the basis of the intent and the intent score) and at least one group identified on the basis of the name of the currently running application (e.g., at least one group corresponding to the level mapped to the name of the currently running application on the hierarchical application category 263) are different, the processor 120 may determine one or more words similar to the previously searched search word from among the words included in at least one group identified on the basis of the intent and the score of the intent. If it is determined that there is no word similar to the previously searched search word among the words included in at least one group identified on the basis of the intent and the score of the intent, the processor 120 may determine one or more words similar to the previously searched search word from among the words included in at least one group identified on the basis of the name of the currently running application.

In addition, the processor 120 may determine one or more words similar to the previously searched search word from among the words included in at least one group identified on the basis of the name of the currently running application. If it is determined that there is no word similar to the previously searched search word among the words included in the at least one group identified on the basis of the name of the currently running application, the processor 120 may determine one or more words similar to the previously searched search word from among the words included in at least one group identified on the basis of the intent and the score of the intent. If it is determined that there is not one or more words similar to the previously searched search word among the words included in at least one group identified on the basis of the intent and the score of the intent and among the words included in the at least one group identified on the basis of the name of the currently running application, the processor 120 may determine one or more words similar to the previously searched search word from among the words included in at least one group corresponding to a level (and/or topic ID) adjacent to (or hierarchically connected to)

the identified level (and/or topic ID) in the hierarchical word graph 261 (e.g., in FIG. 3, if the identified topic ID is topic 2, topic 1 as a higher topic of topic 2 and/or topic 3 as a lower topic of topic 2).

The processor 120 may determine one or more words similar to a previously obtained keyword (e.g., at least one keyword obtained from the content included in the screen while the session is maintained or at least one keyword obtained from the content included in the most recently displayed screen) from among the words included in the at least one identified group.

The processor 120 may determine to recommend an application corresponding to the determined level (and/or topic ID) in addition to the one or more determined words. For example, in the case where the level of the currently running application is determined to be level 2, the processor 120 may determine to recommend another application included in level 2 (or having a level of level 2) in the hierarchical application category.

In step 1013, the processor 120 displays the one or more determined words (and information about the application determined to be recommended) through the display module 160. For example, the processor 120 may display, through the display module 160, the one or more words and/or the application determined to be recommended so as to be adjacent to the input portion (e.g., a search window) for a search or display the same in a specified area of the keyboard. However, a method of displaying one or more words and/or an application determined to be recommended through the display module 160 is not limited to the above-described examples.

Figure 11:
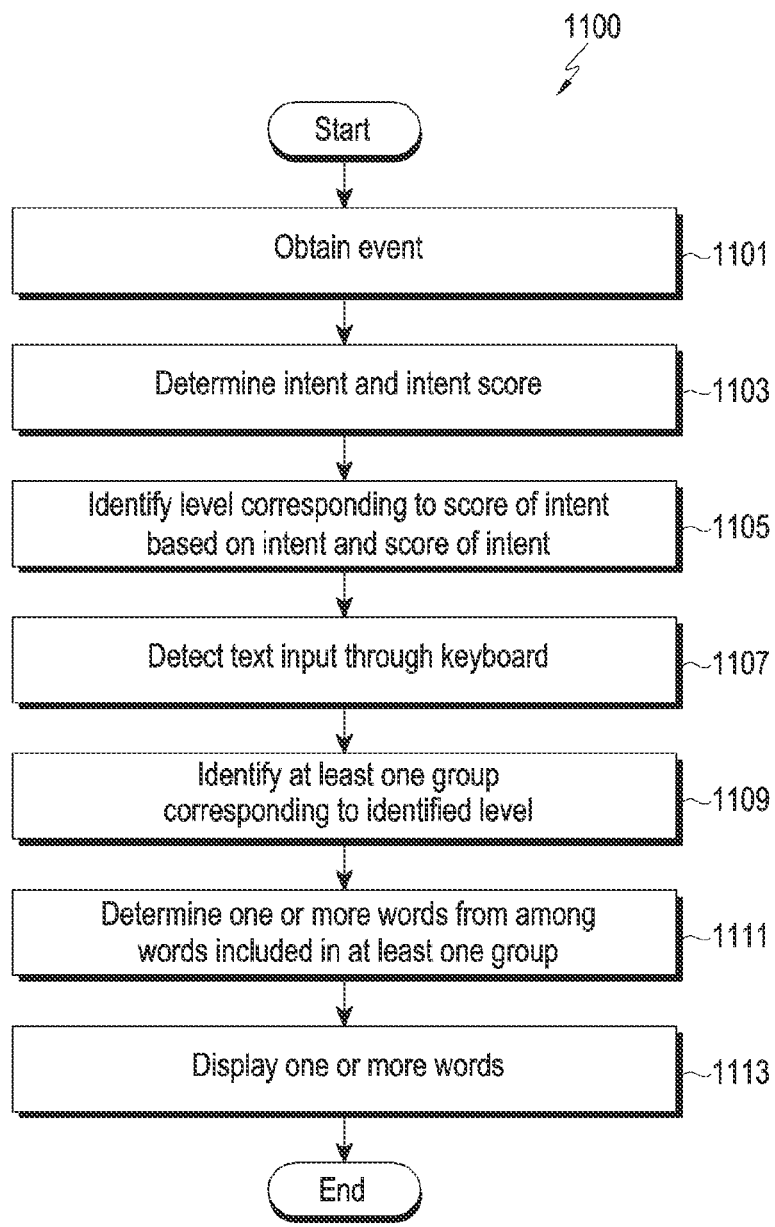
FIG. 11 is a flowchart illustrating a method of providing a search word in the case where text is input through a keyboard, according to an embodiment.

FIG. 11 is a flowchart 1100 illustrating a method of providing a search word in the case where text is input through a keyboard, according to an embodiment.

Referring to FIG. 11, in step 1101, the processor 120 obtains an event while an application is running.

In step 1103, the processor 120 determines intent and an intent score.

In step 1105, the processor 120 determines a level corresponding to the score of intent on the basis of the intent and the score of the intent.

Since the examples of steps 1101 to 1105 are at least partially the same as or similar to the examples of steps 1001 to 1005 in FIG. 10, detailed descriptions thereof will be omitted.

In step 1107, the processor 120 detects a text input through a keyboard.

The processor 120 may obtain text (e.g., a word, a morpheme, or alphabetic characters) for a search input through a keyboard. For example, in the case where the search word desired by the user is "Guam", the processor 120 may obtain "Gua" as text for searching for "Guam" (e.g., only an initial consonant and a media vowel are entered, among the initial consonant, the medial vowel, and the final consonant).

In step 1109, the processor 120 identifies at least one group corresponding to the identified level.

If the text for a search input through the keyboard is obtained, the processor 120 may identify at least one group corresponding to the level (and/or topic ID) on the hierarchical word graph 261. For example, if the text for a search input through the keyboard is obtained, the processor 120 may identify at least one group on the hierarchical word graph 261 on the basis of the intent and the score of the intent. In addition, if the text for a search input through the keyboard is obtained, the processor 120 may identify at least one group on the hierarchical word graph 261 on the basis of the name of the currently running application.

In step 1111, the processor 120 determines one or more words for recommendation from among the words included in at least one group.

The processor 120 may determine one or more words including the text for a search input through the keyboard from among the words included in the at least one identified group. If at least one group identified on the basis of the intent and the score of the intent (e.g., at least one group corresponding to the level identified on the basis of the intent and the intent score) and at least one group identified on the basis of the name of the currently running application (e.g., at least one group corresponding to the level mapped to the name of the currently running application on the hierarchical application category 263) are different, the processor 120 may determine one or more words including the text for a search input through the keyboard from among the words included in at least one group identified on the basis of the intent and the score of the intent. If it is determined that there is no word including the text for a search input through the keyboard among the words included in at least one group identified on the basis of the intent and the score of the intent, the processor 120 may determine one or more words including the text for a search input through the keyboard from among the words included in at least one group identified on the basis of the name of the currently running application.

In addition, the processor 120 may determine one or more words including the text for a search input through the keyboard from among the words included in at least one group identified on the basis of the name of the currently running application. If it is determined that there is no word including the text for a search input through the keyboard among the words included in at least one group identified on the basis of the name of the currently running application, the processor 120 may determine one or more words including the text for a search input through the keyboard from among the words included in at least one group identified on the basis of the intent and the score of the intent. If it is determined that there are not one or more words including the text for a search input through the keyboard among the words included in at least one group identified on the basis of the intent and the score of the intent and among the words included in at least one group identified on the basis of the name of the currently running application, the processor 120 may determine one or more words including the text for a search input through the keyboard from among the words included in at least one group corresponding to a level (and/or topic ID) adjacent to (or hierarchically connected to) the identified level (and/or topic ID) in the hierarchical word graph 261 (e.g., in FIG. 3, if the identified topic ID is topic 2, topic 1 as a higher topic of topic 2 and/or topic 3 as a lower topic of topic 2).

The processor 120 may determine to recommend an application corresponding to the determined level (and/or topic ID) in addition to the one or more determined words.

For example, in the case where the level of the currently running application is determined to be level 2, the processor 120 may recommend another application included in level 2 (or having a level of level 2) in the hierarchical application category.

The processor 120 may recommend one or more words determined on the basis of the aforementioned event related to a user input to the input portion (e.g., a search window) for a search together with one or more words determined on the basis of the text for a search input through the keyboard.

For example, if text for a search is input through a keyboard, the processor 120 may perform an operation of determining one or more words for recommendation on the basis of the input text and determine one or more words for recommendation on the basis of the event related to a user input to the input portion (e.g., a search window) for a search, which has been described with reference to FIG. 10.

In step 1113, the processor 120 displays the one or more determined words (and information about the application determined to be recommended) through the display module 160. For example, the processor 120 may display one or more words (e.g., "Guam" or "Guam airport") including input text (e.g., "Gua") through the display module 160.

Examples of step 1113 are at least partially the same as or similar to those of step 1013, so detailed descriptions thereof will be omitted.

Figure 12:
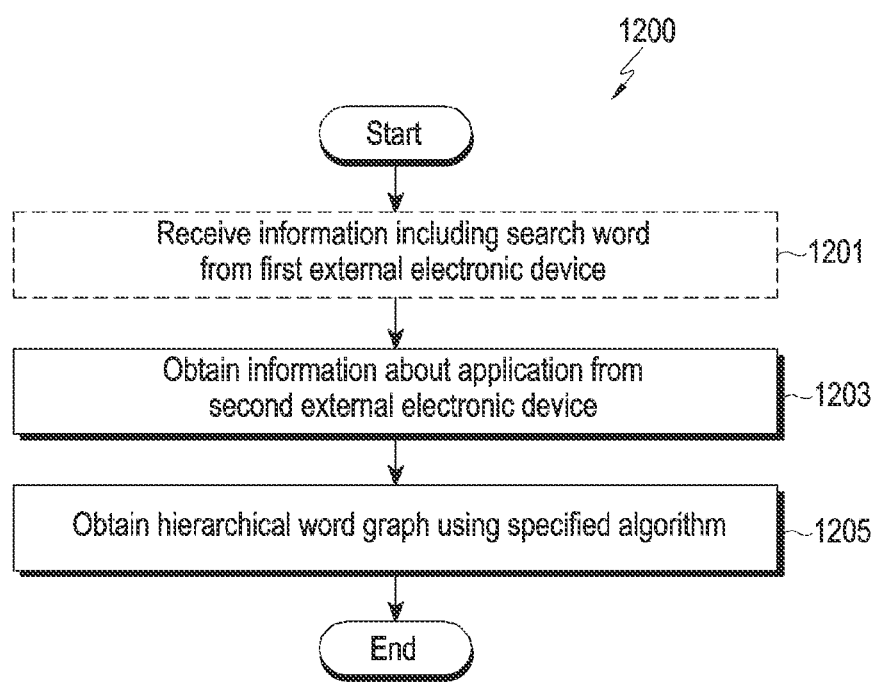
FIG. 12 is a flowchart illustrating a method in which a server updates a hierarchical word graph, according to an embodiment.

FIG. 12 is a flowchart 1200 illustrating a method in which a server 108 updates a hierarchical word graph 541, according to an embodiment.

Referring to FIG. 12, in step 1201, the server 108 receives information including a search word from a first external electronic device.

The server 108 may obtain, from each of one or more electronic devices subscribed (or registered) to the server 108 for providing a search word, a search word used for a search while an application is running and a weight for a search word for each application that has been executed.

The weight for a search word may be configured (e.g., may be assigned) to correspond to the frequency (or the number) of inputs of the search word in one or more electronic devices. For example, the weight for a search word may be configured to be higher as the frequency of performing searching for the search word increases in one or more electronic devices.

However, the information including a search word obtained from one or more electronic devices in order for the server 108 to update (and produce) the hierarchical word graph 541 is not limited to the above-described example. For example, the information including a search word may include a search word, a weight for a search word, and a keyword obtained (e.g., extracted) from the content included in the execution screen of an application.

Alternatively, step 1201 may be omitted. For example, the server 108 may update the hierarchical word graph by performing steps 1203 and 1205 without performing an operation of receiving the information including the search word from the first external electronic device in step 1201.

In step 1203, the server 108 obtains information about the application from the second external electronic device.

The server 108 may obtain information about the application from the second external electronic device in addition to the information including the search word in order to update (and produce) the hierarchical word graph. For example, the server 108 may obtain information including at least one of the title of an application, a description of the application, or an application-related tag from the second external electronic device (e.g., a server that provides an application or a server that stores an application such that the application can be downloaded to the electronic device).

The server 108 may obtain a keyword from the information about the application. For example, the server 108 may obtain (e.g., extract) a keyword from the description of the application using a keyword extraction algorithm.

In step 1205, the server 108 obtains (e.g., updates) the hierarchical word graph 541 using a specified algorithm.

The server 108 may update (and/or produce) the hierarchical word graph on the basis of the information including a search word obtained from the first external electronic device and/or the information about the application obtained from the second external electronic device (e.g., the keyword obtained from the information about the application).

The server 108 may update the hierarchical word graph 541 on the basis of the keyword obtained from the obtained information about the search word and/or application using a technique of topic modeling (e.g., an LDA technique or an HDP technique). The server 108 may use the search word and/or the keyword obtained for each application as input data of the topic modeling technique.

The server 108 may configure (e.g., assign) a weight to the search word. For example, the server 108 may obtain a search word (e.g., the search word used for a search while an application is running) for each application (e.g., for each executed application) from the first external electronic device, and configure a weight for the search word so as to correspond to the frequency (e.g., the number) of acquisitions of the search word by the first external electronic device. The server 108 may configure a weight for the search word to be higher as the frequency of obtaining the search word increases. A weight for the search word may be configured in the first external electronic device. For example, the first external electronic device may configure a weight for the input search word on the basis of the frequency at which the search word is input. The server 108 may receive, from the first external electronic device, a weight for the search word together with the information about the search word.

The server 108 may configure a higher weight for the search word than for a keyword obtained on the basis of the information about the application.

The server 108 may update the hierarchical word graph 541 on the basis of a weight configured for the obtained search word and a weight for the obtained keyword using a topic modeling technique together with the obtained search word and/or the obtained keyword.

A search word and/or keyword configured with a high weight may have a high probability of being included in groups of the topic IDs included in the hierarchical word graph, and a search word and/or keyword configured with a low weight may have a low probability of being included in groups of the topic IDs included in the hierarchical word graph.

Figure 13:
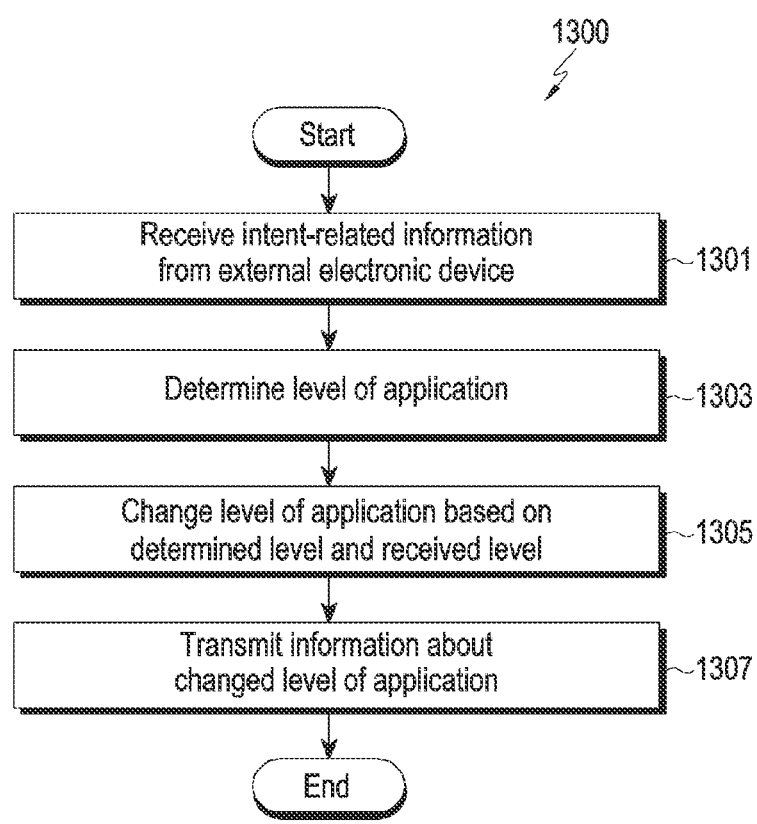
FIG. 13 is a flowchart illustrating a method in which a server updates a hierarchical application category, according to an embodiment.

FIG. 13 is a flowchart 1300 illustrating a method in which a server 108 updates a hierarchical application category 543, according to an embodiment.

Figure 15A:
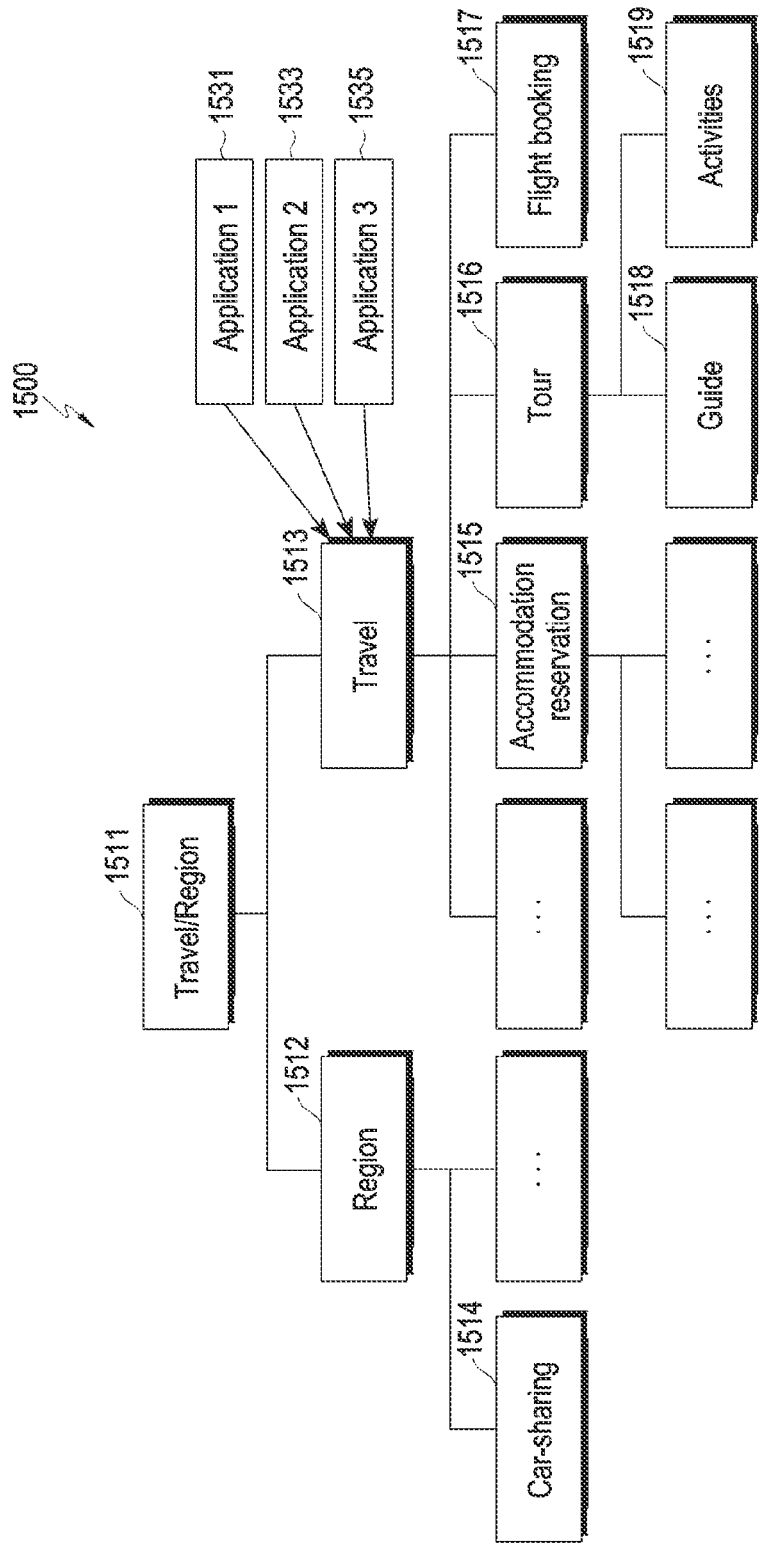
Figure 15B:
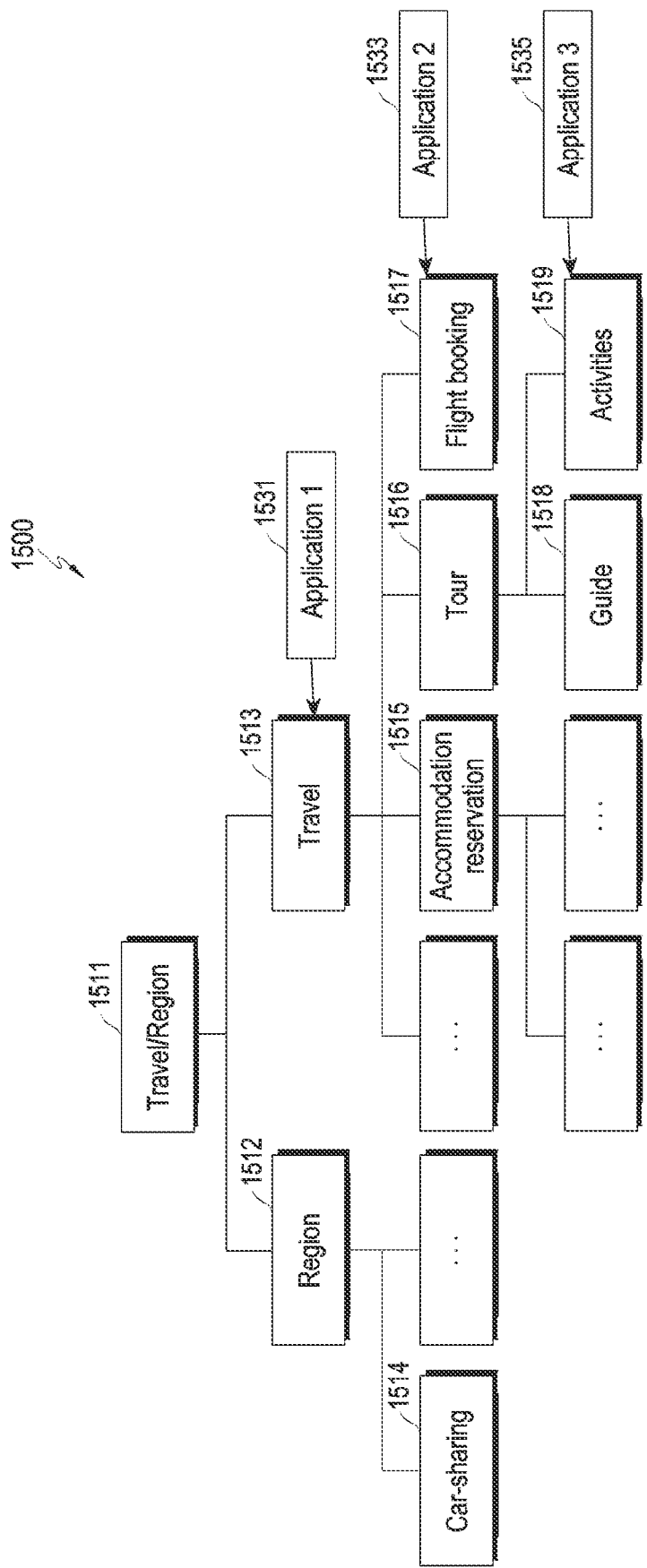

FIGS. 14, 15A, and 15B are diagrams 1400 and 1500 illustrating methods in which a server 108 updates a hierarchical application category 543, according to various embodiments.

Referring to FIGS. 13 to 15B, in step 1301, the server 108 receives intent-related information from an external electronic device. For example, the server 108 may receive, from a plurality of external electronic devices, intent-related information obtained by the plurality of external electronic devices for a specified time. The intent-related information may be information anonymized in the plurality of external electronic devices.

The intent-related information may include at least one of information about an application, intent related to an application and a score of the intent, a search word (e.g., a search word and a weight configured for the search word), or a keyword (e.g., a keyword obtained from the content included in the execution screen of an application), which are obtained by the external electronic device for a specified time.

The information about an application may include the name of an application, the category of an application, and the level of an application (e.g., the level on the hierarchical application category 263).

If a plurality of applications are executed in the external electronic device for a specified time, the intent-related information may include at least one of information about an application, intent related to an application and a score of the intent, or a keyword for the plurality of applications.

The server 108 may periodically receive the intent-related information from an external electronic device.

In step 1303, the server 108 determines the level (and topic ID) of the application on the basis of the intent-related information using the hierarchical word graph 541.

The server 108 may identify a plurality of applications having the same intent (highest category) from the intent-related information (e.g., the information about the application) obtained from the external electronic device.

The server 108 may identify levels (and topic IDs) on the hierarchical word graph 541 for the plurality of identified applications on the basis of at least one of intent, a score of the intent, a search word (e.g., a search word and a weight configured for the search word), or a keyword for each of the plurality of identified applications. Since the examples of identifying the level (and topic ID) on the hierarchical word graph 541 on the basis of at least one of intent, a score of the intent, a search word, or a keyword have been described above, detailed descriptions thereof will be omitted.

Although the above example describes that a plurality of applications having the same intent are identified in the intent-related information obtained from the external electronic device and that the level (and/or topic ID) of each of the plurality of identified applications is identified on the hierarchical word graph 541, additionally or alternatively, the server 108 may also identify an application having a score of the intent greater than or equal to a specified score in the intent-related information obtained from the external electronic device and identify a level (and/or topic ID) of the identified application on the hierarchical word graph 541.

In step 1305, the server 108 changes (or updates) the level (and/or topic ID) of the application on the hierarchical application category 543 on the basis of the level (and/or topic ID) of the application determined in step 1303 (hereinafter, referred to as "a determined level of an application") and the level (and/or topic ID) of the application included in the intent-related information received in step 1301 (hereinafter, referred to as "a received level of an application").

The server 108 may identify whether or not the determined level (and/or topic ID) of the application and the received level (and/or topic ID) of the application are different.

In the case where intent-related information is received from a plurality of external electronic devices, the server 108 may identify whether or not the determined level (and/or topic ID) of an application and the received level (and/or topic ID) of the application are different with respect to an application included in the received intent-related information (e.g., at least one of the name of an application, an application ID, a tag, or a category).

In the case where intent-related information is received from a plurality of external electronic devices, the server 108 may identify whether the number of times the determined level (and/or topic ID) of an application and the received level (and/or topic ID) of the application are different is greater than or equal to a specified number of times. For example, in the case where intent-related information is received from a plurality of external electronic devices, the server 108 may identify whether the number of times the determined level (and/or topic ID) of an application and the received level (and/or topic ID) of an application are identified to be different is greater than or equal to a specified number of times.

If it is identified that the number of times the determined level (and/or topic ID) of an application and the received level (and/or topic ID) of an application are different is greater than or equal to a specified number of times, the server 108 may determine (e.g., change) the determined level (and/or topic ID) of the application to be the level of the application on the hierarchical word graph.

However, the method in which the server 108 changes the level of the application is not limited to the above-described example.

In step 1307, the server 108 transmits information about the changed level of the application to the external electronic device. For example, the server 108 may transmit a hierarchical application category 543 reflecting the changed level of the application to the external electronic device.

FIGS. 14, 15A, and 15B are diagrams 1400 and 1500 illustrating methods in which a server 108 updates a hierarchical application category 543, according to various embodiments.

Referring to FIGS. 14, 15A, and 15B, the server 108 may receive intent-related information from each of a plurality of external electronic devices as shown in FIG. 14. For example, the server 108 may receive information 1410, 1420, 1430, or 1440 related to intent for at least one of application 1, application 2, or application 3 from a plurality of external electronic devices (e.g., electronic devices of a user #1 to a user #N). The information 1410, 1420, 1430, or 1440 related to the intent may be information anonymized in the plurality of external electronic devices.

The server 108 may update a hierarchical application category through the examples described with reference to FIG. 13. For example, FIG. 15A may show a hierarchical application category before updating, and FIG. 15B may show a hierarchical application category after updating. In each of FIGS. 15A and 15B, "Travel/Region 1511" may indicate a category of level 1 (a highest category level); "Region 1512" and "Travel 1513" may indicate a category of level 2; "Car-sharing 1514, "Accommodation reservation 1515", "Tour 1516", and "Flight booking 1517" may represent a category of level 3; and "Guide 1518" and "Activities 1519" may indicate a category of level 4. As shown in FIG. 15A, in the hierarchical application category before updating, application 1 1531, application 2 1533, and application 3 1535 may be included in the category "Travel 1513" of level 2. As shown in FIG. 15B, in the hierarchical application category after updating, application 1 1531 may be included in the category "Travel 1513" of level 2, application 2 1533 may be included in the category "Flight booking 1517" of level 3, and application 3 1535 may be included in the category "Activities 1519" of level 4.

Figure 16:
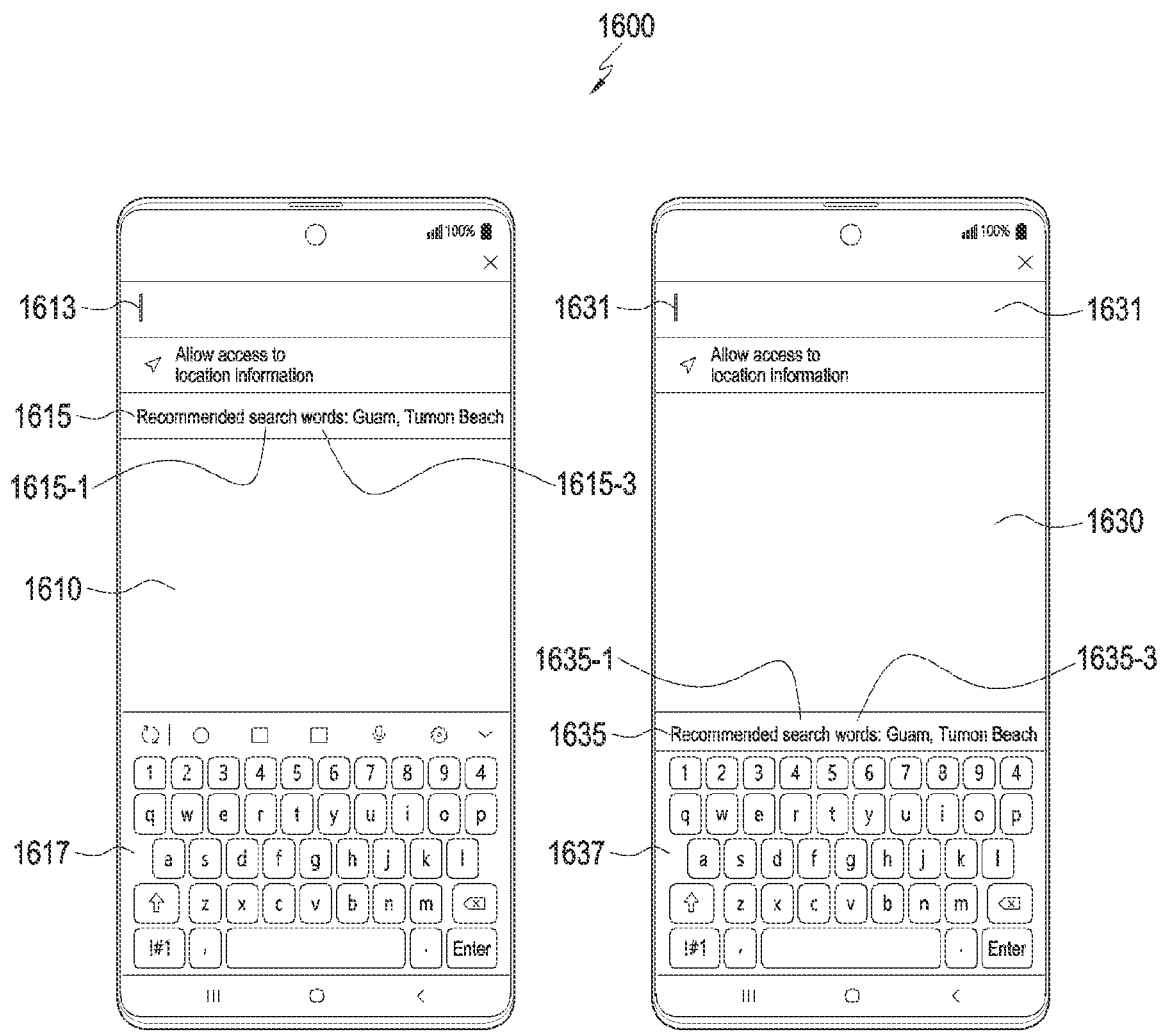
FIG. 16 is a diagram illustrating a method of providing a search word on the basis of an input to an input portion for a search, according to an embodiment.

FIG. 16 is a diagram 1600 illustrating a method of providing a search word on the basis of an input to an input portion for a search, according to an embodiment.

Referring to FIG. 16, in an embodiment, the processor 120 may provide a search word on the basis of an input to an input portion for a search.

The processor 120 may obtain a touch (or click input) onto the input portion 1611 or 1631 (e.g., a search window) for a search included in a screen (e.g., the screen 1610 or the screen 1630) on which an application is running.

If a touch onto the input portion 1611 for a search is obtained, the processor 120 may display, through the display module 160, a cursor 1613 in the input portion 1611 for a search and display, together with a keyboard 1617, Guam 1615-1 and Tumon Beach 1615-3 as search words (recommended search words) in the area 1615 of the screen 610.

If a touch onto the input portion 1631 for a search is obtained, the processor 120 may display, through the display module 160, a cursor 1633 in the input portion 1631 for a search and display, together with a keyboard 1637, Guam 1635-1 and Tumon Beach 1635-3 as search words (recommended search words) in the area 1635 of the keyboard 1637.

However, the method in which the processor 120 displays the search words is not limited to the above-described example.

Figure 17:
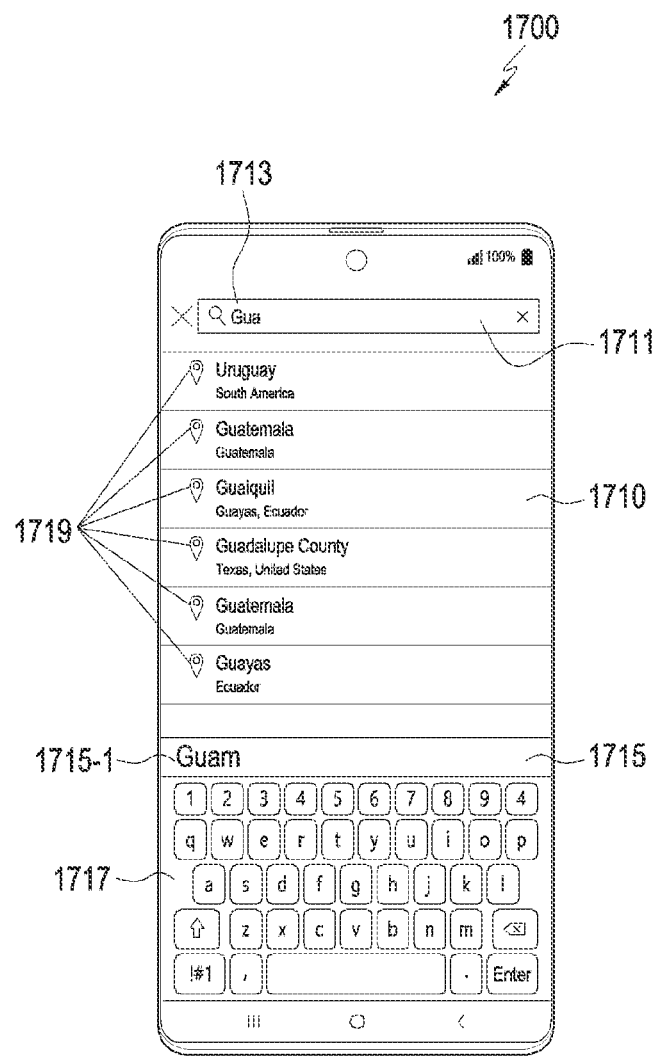
FIG. 17 is a diagram illustrating a method of providing a search word on the basis of text input through a keyboard, according to an embodiment.

FIG. 17 is a diagram 1700 illustrating a method of providing a search word on the basis of text input through a keyboard, according to an embodiment.

Referring to FIG. 17, if text (e.g., "Gua 1713") is input through a keyboard 1717, the processor 120 may display the input text through the display module 160. If text (e.g., "Gua 1713") is input through the keyboard 1717, the processor 120 may display a recommended search word (e.g., "Guam 1715-1") including the input text (e.g., "Gua 1713"), which is determined through the examples in FIG. 11, in the area 1715 of the keyboard 1717 through the display module 160 together with recommended search words 1719 related to the input text (e.g., "Gua 1713"). However, the method of providing a search word on the basis of the text input through the keyboard is not limited to the above-described example.

Figure 18A:
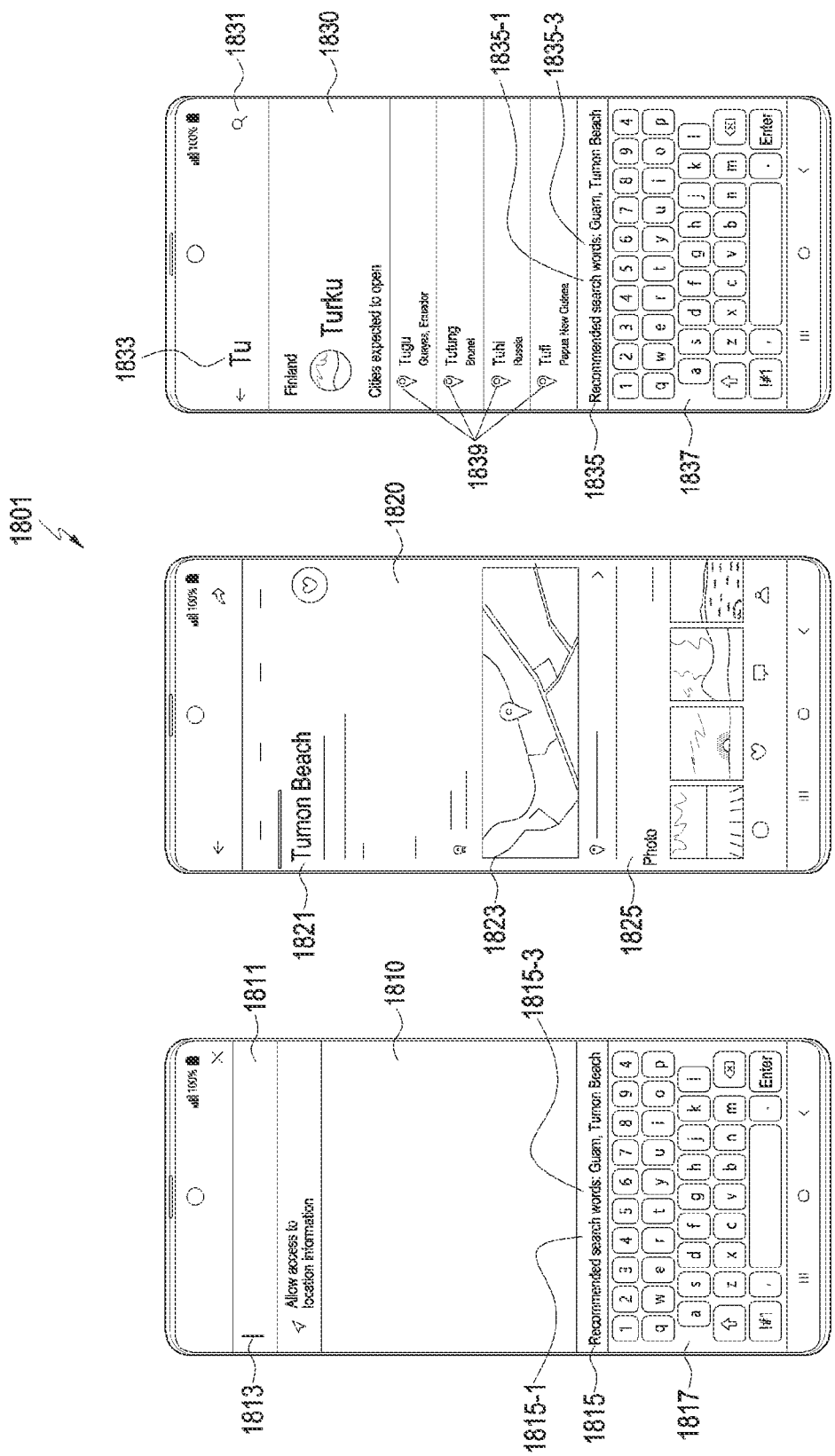
FIGS. 18A and 18B are diagrams illustrating methods of providing a search word, according to various embodiments.
Figure 18B:
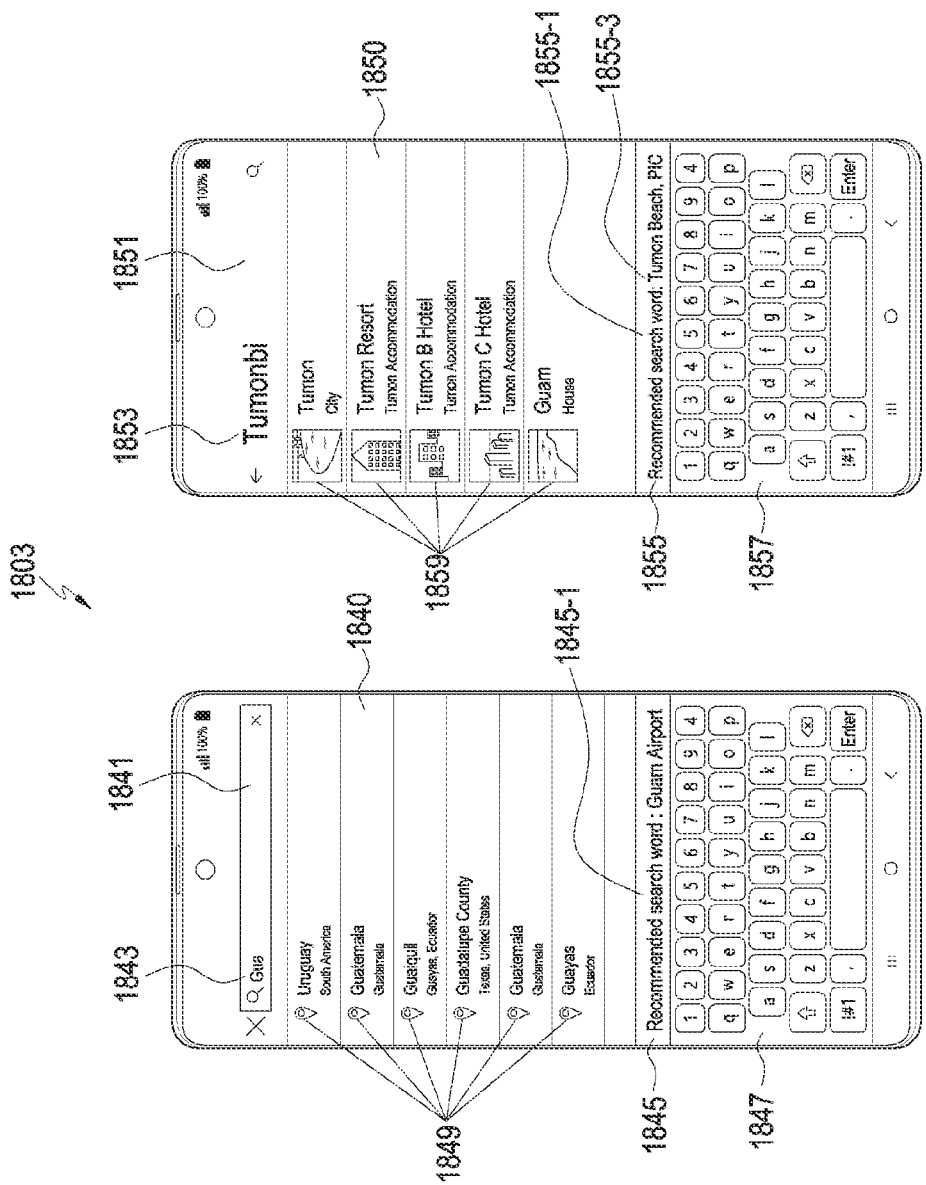

FIGS. 18A and 18B are diagrams 1801 and 1803 illustrating methods of providing a search word, according to various embodiments.

Referring to FIGS. 18A and 18B, the processor 120 may determine intent (e.g., when the state of the intent is new entry) on the basis of the event obtained while a first application is running. If an input to an input portion 1811 for a search is detected after the intent is determined as shown in the screen 1810, the processor 120 may display recommended search words (e.g., "Guam 1815-1" and "Tumon Beach 1815-3") in an area 1815 of a keyboard 1817 through the display module 160.

On the basis of an input for selecting the recommended search word ("Tumon Beach 1815-3") (or an input for selecting the recommended search word and executing searching for the selected recommended search word), the processor 120 may display a description 1821 of the selected recommended search word, a map 1823 related to the recommended search word, and an image 1825 related to the recommended search word through the display module 160 as shown in the screen 1820. The processor 120 may increase the score of the intent if a search for the recommended search word is executed by selecting the recommended search word.

If text (e.g., "Tu 1833") is input through a keyboard 1837 while a second application is running, the processor 120, as shown in a screen 1830, may display, through the display module 160, the text (e.g., "Tu 1833") input to the input portion 1831 for a search and display a recommended search word (e.g., "Tumon Beach 1835-1") including the input text (e.g., "Tu 1833") and a recommended search word (e.g., "Guam 1835-1") related to the intent together with recommended search words 1839 related to the input text (e.g., "Tu 1833"). If a search for the recommended search word is executed by selecting the recommended search word, the processor 120 may increase the score of the intent.

The processor 120 may execute a third application having a level higher than the level of the second application while the second application is running. For example, while the second application is running, the processor 120 may obtain an application switch event for switching from the second application to the third application having a level higher than the level of the second application.

The processor 120 may increase the score of the intent if the level of the application after the application switch is higher than the level of the application before the application switch.

If text (e.g., "Gua 1843") is input through a keyboard 1847 while the third application is running, the processor 120, as shown in a screen 1840, may display, through the display module 160, the input text (e.g., "Gua 1843") in an input portion 1841 for a search and display a recommended search word (e.g., "Guam airport 1845-1") including the input text (e.g., "Gua 1843") together with recommended search words 1849 related to the input text (e.g., "Gua 1843"). The processor 120 may increase the score of the intent if a search for the recommended search word is executed by selecting the recommended search word.

If text (e.g., "Tumonbi 1851") is input through a keyboard 1857 while the third application is running, the processor 120, as shown in a screen 1850, may display, through the display module 160, the input text (e.g., "Tumonbi 1851") in an input portion 1851 for a search and display a recommended search word (e.g., "Tumon Beach 1855-1") including the input text (e.g., "Tumonbi 1851") and a recommended search word (e.g., "PIC 1855-3") related to the intent together with recommended search words 1859 related to the input text (e.g., "Tumonbi 1851"). The processor 120 may increase the score of the intent if a search for the recommended search word is executed by selecting the recommended search word.

Figure 19:
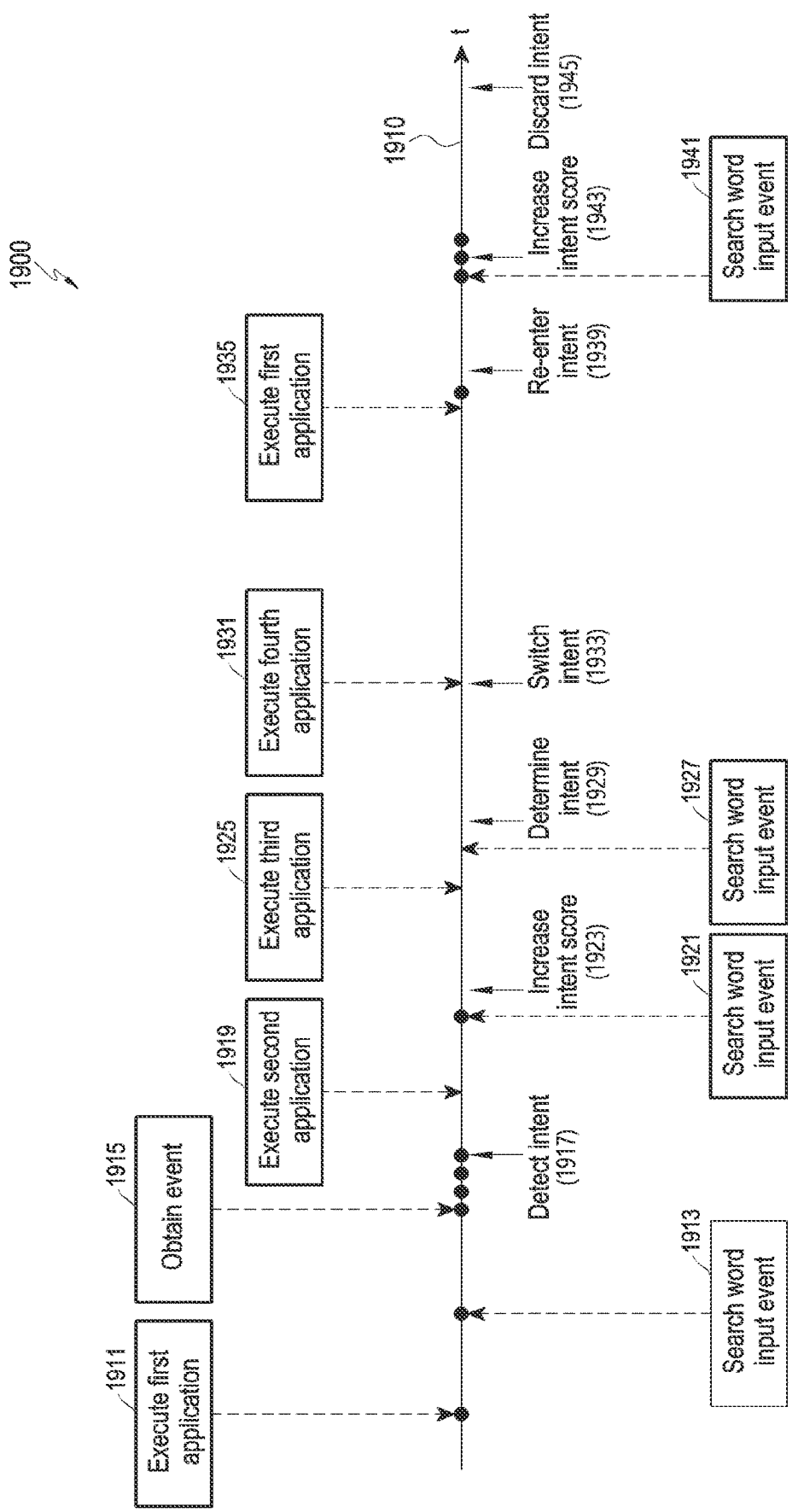
FIG. 19 is a diagram illustrating a method of providing a search word, according to an embodiment.

FIG. 19 is a diagram 1900 illustrating a method of providing a search word, according to an embodiment.

FIG. 19 may be a diagram intended to explain intent according to an event input from a user according to a time (t) depicted by line 1910.

The processor 120 may execute a first application on the basis of a user input at a time corresponding to step 1911. The processor 120 may detect a first candidate intent related to the first application while the first application is running. The processor 120 may obtain a search word input event while the first application is running at a time corresponding to step 1913. If the search word input event is obtained, the processor 120 may increase the score of the first candidate intent. The processor 120 may obtain an event related to an input to the screen on which the first application is running at a time corresponding to step 1915, and increase the score of the first candidate intent.

The processor 120 may obtain an application switch event for switching from the first application to a second application at a time corresponding to step 1919. On the basis of the obtained application switch event, it may be identified that the highest category of the second application is the same as the highest category of the first application. The processor 120 may obtain a search word input event while the second application is running at a time corresponding to step 1921. The processor 120 may increase the score of the first candidate intent on the basis of the obtained search word input event at a time corresponding to step 1923.

The processor 120 may obtain an application switch event for switching from the second application to a third application at a time corresponding to step 1925. On the basis of the obtained application switch event, it may be identified that the highest category of the third application is the same as the highest category of the second application (or the first application). The processor 120 may obtain a search word input event while the third application is running at a time corresponding to step 1927. The processor 120 may increase the score of the first candidate intent on the basis of the obtained search word input event. The processor 120 may determine the first candidate intent as a first intent if the score of the first candidate intent is greater than or equal to a threshold score at a time corresponding to step 1929.

The processor 120 may obtain an application switch event for switching from the third application to a fourth application at a time corresponding to step 1931. On the basis of the obtained application switch event, it may be identified that the highest category of the fourth application is different from the highest category of the third application. If the highest category of the fourth application is different from the highest category of the third application, the processor 120 may switch the intent at a time corresponding to step 1933. For example, the processor 120 may maintain (or hold) the first intent and perform an operation of detecting intent related to the fourth application.

The processor 120 may obtain an event related to an input of re-executing the first application at a time corresponding to step 1935. If the first application is re-executed, the processor 120 may determine the state of the first intent to be re-entry at a time corresponding to step 1939.

The processor 120 may obtain a search word input event while the first application is running at a time corresponding to step 1941. If the search word input event is obtained, the processor 120 may increase the score of the first intent.

If an event related to the first application is not obtained for a specified time after terminating the execution of the first application, the processor 120 may discard the first intent and release the session for the first intent.

According to an embodiment, a method of providing a search word in an electronic device may include obtaining an event while an application is executed, determining an intent and a score of the intent based on the event, identifying a level corresponding to the score of the intent from among a plurality of levels of a hierarchical word graph including a plurality of groups classified by a plurality of levels stored in a memory of the electronic device based on the intent and the score of the intent, determining one or more words from among words included in at least one group corresponding to the identified level, among the plurality of groups, based on an input for a search being detected, and displaying the one or more determined words through a display module of the electronic device.

Determining the intent and the score of the intent may further include detecting candidate intent based on the event, and, based on a score for the candidate intent being greater than or equal to a threshold score, determining the candidate intent as the intent.

Identifying the level corresponding to the score of the intent may further include identifying the level and topic ID in the hierarchical word graph based on the intent, the score of the intent, a search word obtained while the application is executed, and a keyword obtained while the application is executed.

Determining the one or more words may further include determining the one or more words from among the words included in the at least one group corresponding to the identified level in the hierarchical word graph based on an input to an input portion for a search being detected.

Determining the one or more words may further include, based on an input to the input portion for a search being detected, obtaining a search word inputted while the intent is maintained and/or a keyword obtained from content displayed through the display module while the intent is maintained, identifying a similarity between the search word and/or the keyword and the words included in the at least one group, and determining the one or more words having a similarity greater than or equal to a specified similarity from among the words.

Determining the one or more words may further include, based on a text being inputted through a keyboard, determining the one or more words including the text from among words included in at least one group corresponding to the identified level in the hierarchical word graph.

Identifying the level corresponding to the score of the intent may further include identifying the level using a hierarchical application category, which is stored in the memory and in which a level is set for each of the categories of a plurality of applications, based on a name of the application.

Displaying the one or more determined words may further include displaying, through the display module, an application having a same level as the level in the hierarchical application category together with the one or more determined words.

The method further includes transmitting, to a server through a communication module of the electronic device, information including at least one of intent, a score of the intent, a name of the application, a category of the application, a topic ID of the application, or a keyword, which are obtained for a specified time, and receiving, from the server through the communication module, a hierarchical application category updated by the server based on the information.

The intent may be a category of the highest levels of the hierarchical word graph and the hierarchical application category.

In addition, the structure of data used in the above-described embodiment of the disclosure may be recorded in a computer-readable recording medium through various means. The computer-readable recording medium includes a storage medium such as a magnetic storage medium (e.g., a ROM, a floppy disk, a hard disk, etc.) and an optically readable medium (e.g., a CD-ROM, a DVD, etc.).

A computer-readable recording medium, on which computer-executable programs are recorded, may record a program that causes an electronic device 101 to execute operations of obtaining an event while an application is running, determining intent and a score of the intent on the basis of the event, identifying a level corresponding to the score of the intent on the basis of the intent and the score of the intent, determining one or more words from among words included in at least one group corresponding to the level identified in a hierarchical word graph 261 stored in a memory 130 of the electronic device 101, if an input for a search is detected, and displaying the one or more determined words through a display module 160 of the electronic device 101.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
a display module;

at least one processor operably connected to the display module; and a memory operably connected to the at least one processor and configured to store a plurality of hierarchical word graphs and a plurality of hierarchical application categories, each of the plurality of hierarchical word graphs comprising a plurality of groups classified by a plurality of levels, each of the plurality of hierarchical application categories comprising a plurality of categories corresponding to a plurality of applications classified by the plurality of levels, wherein the memory stores instructions configured to cause, when executed, the electronic device to:

obtain an event while an application is executed, determine, based on the event, an intent among a plurality of intents and a score of the intent, based on the event, wherein the plurality of intents are a plurality of highest categories, respectively, each of the highest plurality of categories corresponding to a group having a highest level of the plurality of levels among the plurality of groups, wherein the determined intent is a category having the highest level of the plurality of levels in a hierarchical application category which a name of the executed application belongs to, identify, based on the intent and the score of the intent, a level corresponding to the score of the intent and the name of the executed application from among the plurality of levels, wherein the plurality of levels correspond to a plurality of score ranges of the intent in each of the plurality of hierarchical word graphs, and the determined score belongs to a score range corresponding to the identified level among the plurality of score ranges, determine one or more words from among words included in at least one group corresponding to the identified level, among the plurality of groups, based on an input for a search being detected, and display the one or more determined words through the display module.

2. The electronic device of claim 1, wherein the instructions are further configured to cause the electronic device to:

detect candidate intent based on the event, and based on a score for the candidate intent being greater than or equal to a threshold score, determine the candidate intent as the intent.

3. The electronic device of claim 1, wherein the instructions are further configured to cause the electronic device to identify the level and topic identity (ID) in the hierarchical word graph, based on the intent, the score of the intent, a search word obtained while the application is executed, and a keyword obtained while the application is executed.

4. The electronic device of claim 1, wherein the instructions are further configured to cause the electronic device to determine the one or more words from among the words included in the at least one group corresponding to the level identified in the hierarchical word graph based on an input to an input portion for a search being detected.

5. The electronic device of claim 4, wherein the instructions are further configured to cause the electronic device to:

based on an input to the input portion for a search being detected, obtain a search word inputted while the intent is maintained or a keyword obtained from content displayed through the display module while the intent is maintained, identify a similarity between the search word or the keyword and the words included in the at least one group, and determine the one or more words having a similarity greater than or equal to a specified similarity from among the words.

6. The electronic device of claim 1, wherein the instructions are further configured to cause the electronic device to:

based on a text being inputted through a keyboard, determine the one or more words comprising the text from among words included in at least one group corresponding to the level identified in the hierarchical word graph.

7. The electronic device of claim 1, wherein the instructions are further configured to cause the electronic device to display, through the display module, an application having a same level as the level in the hierarchical application category together with the one or more determined words.

8. The electronic device of claim 1, further comprising a communication module, wherein the instructions are further configured to cause the electronic device to:

transmit, to a server through the communication module, information comprising at least one of the intent, the score of the intent, a name of the application, a category of the application, a topic identity (ID) of the application, or a keyword, which are obtained for a specified time, and receive, from the server through the communication module, a hierarchical application category updated by the server based on the information.

9. A method of providing a search word in an electronic device, the method comprising:

obtaining an event while an application is executed;

determining, based on the event, an intent and a score of the intent among a plurality of intents, wherein a plurality of hierarchical word graphs and a plurality of hierarchical application categories are stored in a memory of the electronic device, each of the plurality of hierarchical word graphs comprising a plurality of groups classified by a plurality of levels, each of the plurality of hierarchical application categories comprising a plurality of categories corresponding to a plurality of applications classified by the plurality of levels, wherein the plurality of intents are a plurality of highest categories, respectively, each of the highest plurality of categories corresponding to a group having a highest level of the plurality of levels among the plurality of groups, wherein the determined intent is to a category having the highest level of the plurality of levels in a hierarchical application category which a name of the executed application belongs to;

based on the intent and the score of the intent, identifying a level corresponding to the score of the intent and the name of the executed application from among the plurality of levels, wherein the plurality of levels correspond to a plurality of score ranges of the intent in each of the plurality of hierarchical word graphs, and the determined score belongs to a score range corresponding to the identified level among the plurality of score ranges;

determining one or more words from among words included in at least one group corresponding to the identified level, among the plurality of groups, based on an input for a search being detected, and displaying the one or more determined words through a display module of the electronic device.

10. The method of claim 9, wherein determining the intent and the score of the intent comprises:

detecting candidate intent based on the event; and based on a score for the candidate intent being greater than or equal to a threshold score, determining the candidate intent as the intent.

11. The method of claim 9, wherein identifying the level corresponding to the score of the intent comprises identifying the level and topic identity (ID) in the hierarchical word graph based on the intent, the score of the intent, a search word obtained while the application is executed, and a keyword obtained while the application is executed.

12. The method of claim 9, wherein determining the one or more words comprises determining the one or more words from among the words included in the at least one group corresponding to the identified level in the hierarchical word graph based on an input to an input portion for a search being detected.

13. The method of claim 12, wherein determining the one or more words comprises:
- based on an input to the input portion for a search being detected, obtaining a search word inputted while the intent is maintained or a keyword obtained from content displayed through the display module while the intent is maintained;
- identifying a similarity between the search word or the keyword and the words included in the at least one group; and
- determining the one or more words having a similarity greater than or equal to a specified similarity from among the words.

14. The method of claim 9, wherein determining the one or more words further comprises:
- based on a text being inputted through a keyboard, determining the one or more words comprising the text from among words included in at least one group corresponding to the identified level in the hierarchical word graph.

15. The method of claim 9, wherein displaying the one or more determined words comprises displaying, through the display module, an application having a same level as the level in the hierarchical application category together with the one or more determined words.

16. The method of claim 9, further comprising:
- transmitting, to a server through a communication module of the electronic device, information comprising at least one of the intent, the score of the intent, a name of the application, a category of the application, a topic identity (ID) of the application, or a keyword, which are obtained for a specified time; and
- receiving, from the server through the communication module, a hierarchical application category updated by the server based on the information.

* * * * *